United States Patent
Hashimoto et al.

(10) Patent No.: US 10,072,603 B2
(45) Date of Patent: Sep. 11, 2018

(54) CONTROL DEVICE FOR INTERNAL COMBUSTION ENGINE

(71) Applicant: TOYOTA JIDOSHA KABUSHIKI KAISHA, Tokyo-shi, Aichi-ken (JP)

(72) Inventors: Susumu Hashimoto, Susono (JP); Motonari Yarino, Mishima (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/325,205

(22) PCT Filed: Jul. 7, 2015

(86) PCT No.: PCT/JP2015/069978
§ 371 (c)(1),
(2) Date: Jan. 10, 2017

(87) PCT Pub. No.: WO2016/013432
PCT Pub. Date: Jan. 28, 2016

(65) Prior Publication Data
US 2017/0191441 A1    Jul. 6, 2017

(30) Foreign Application Priority Data
Jul. 23, 2014 (JP) ................. 2014-149902

(51) Int. Cl.
*F02D 41/40* (2006.01)
*F02D 41/26* (2006.01)
(Continued)

(52) U.S. Cl.
CPC ............ *F02D 41/40* (2013.01); *F02B 23/101* (2013.01); *F02D 41/26* (2013.01);
(Continued)

(58) Field of Classification Search
CPC ............... F02D 41/40; F02D 2041/389; F02D 2200/063; F02B 23/101; F02P 5/045
(Continued)

(56) References Cited

U.S. PATENT DOCUMENTS

2004/0025834 A1* 2/2004 Wurfel ................. F02B 23/101
                                                            123/305
2006/0207551 A1    9/2006 Ikoma
(Continued)

FOREIGN PATENT DOCUMENTS

DE    10 2005 044 544 A1    3/2007
DE    10 2010 011 105 A1    9/2011
(Continued)

*Primary Examiner* — Mahmoud Gimie
(74) *Attorney, Agent, or Firm* — Sughrue Mion, PLLC

(57) ABSTRACT

The invention relates to a control device applied to a cylinder injection type of an internal combustion engine (10). The control device control a disperse parameter for changing a degree of a spread of the fuel spray injected from the injector (20) such that the maximum degree of the spread of the fuel spray under a state where an amount of the fuel adhering to the spark generation part (31*a*) of the spark plug (30) at the ignition timing corresponds to a first amount, is smaller than the maximum degree of the spread of the fuel spray under a state where the amount of the fuel adhering to the spark generation part at the ignition timing corresponds to a second amount smaller than said first amount.

15 Claims, 11 Drawing Sheets

(51) Int. Cl.
    *F02D 41/38*     (2006.01)
    *F02D 41/30*     (2006.01)
    *F02P 5/04*     (2006.01)
    *F02B 23/10*     (2006.01)

(52) U.S. Cl.
    CPC ..... *F02D 41/3023* (2013.01); *F02D 41/3809* (2013.01); *F02P 5/045* (2013.01); *F02D 2041/389* (2013.01); *F02D 2200/021* (2013.01); *F02D 2200/063* (2013.01)

(58) Field of Classification Search
    USPC .................... 123/406.47, 299, 300, 304, 305
    See application file for complete search history.

(56) References Cited

U.S. PATENT DOCUMENTS

2007/0068482 A1*   3/2007   Yamashita ............ F02B 17/005
                                                             123/276
2011/0155105 A1*   6/2011   Sukegawa ............... F02D 41/20
                                                              123/478

FOREIGN PATENT DOCUMENTS

| | | |
|---|---|---|
| JP | 2008-031930 A | 2/2008 |
| JP | 2012-241590 A | 12/2012 |

\* cited by examiner (A) (B)

Fig.5
(A) ≪COMPLETELY CLOSED≫
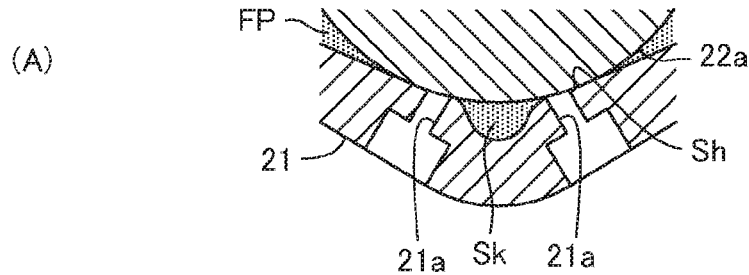
(B) ≪PARTIAL LIFT≫
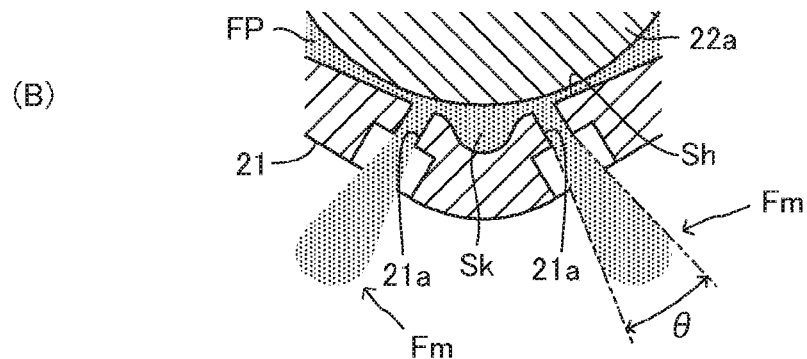
(C) ≪FULL LIFT≫
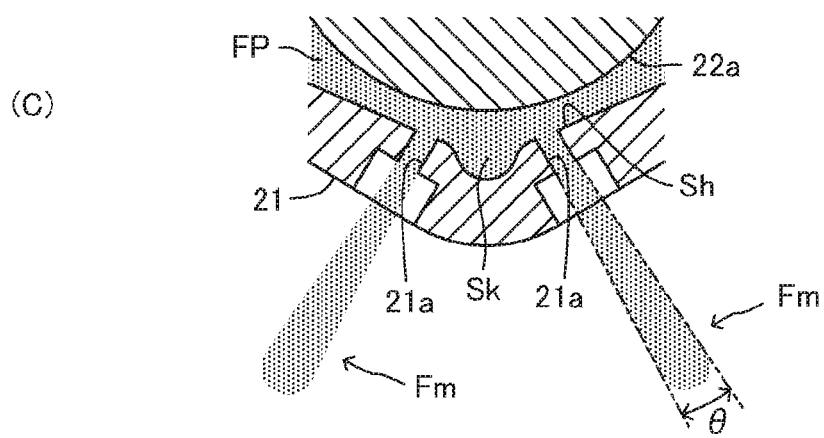

INTERVAL WITH RESPECT TO PRE-
INJECTION Tint

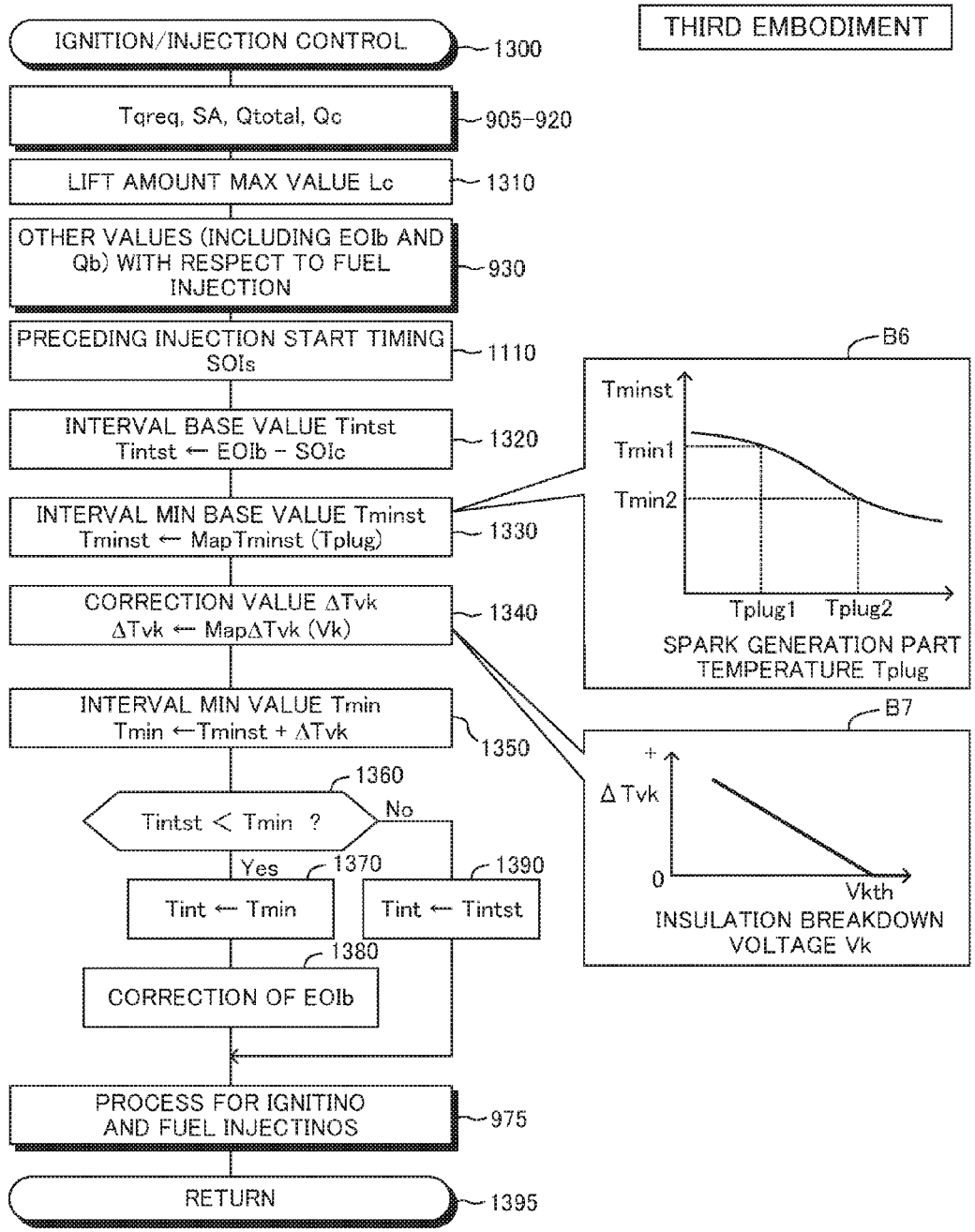

CONTROL DEVICE FOR INTERNAL COMBUSTION ENGINE

TECHNICAL FIELD

This invention relates to a control device for a cylinder injection type of an internal combustion engine comprising an injector (an in-cylinder fuel injector for injecting a fuel directly into a cylinder (a combustion chamber).

BACKGROUND ART

One of the conventionally known cylinder injection type of the internal combustion engine comprises fuel injectors and spark plugs. Each of the injector has at least one injection hole exposing to the interior of the combustion chamber. Each of the spark plug has a spark generation part (an electrode part) exposing to the interior of the combustion chamber. In one of such engines, the injector and the corresponding spark plug are positioned such that the fuel (actually, the fuel spray) injected from the injector reaches the spark generation part of the spark plug directly (for example, refer to the Patent Literature 1). Thereby, the mixture gas having a high ignition property can be formed around the spark generation part and can be ignited. As a result, the amount of the injected fuel can be reduced and thus, the fuel consumption can be improved. Such an engine is also referred to as "a spray guided type of the internal combustion engine" because the fuel spray is introduced (guided) directly to the spark generation part by the fuel injection.

CITATION LIST

Patent Literature

[PTL. 1]
  JP 2008-31930 A

SUMMARY OF INVENTION

In the spray guided type of the engine, because the fuel spray reaches the spark generation part of the spark plug directly, the spark is often generated under a state where the fuel adheres to the spark generation part and as a result, the smolder of the spark plug occurs.

The invention is made to solve the problem described above. That is, one of the objects of the invention is to provide a control device of an internal combustion engine, applied to a spray guided type of the engine in which the fast increasing of the smolder of the spark plug is prevented. Hereinafter, the control device according to the invention will be referred to as "the invention device".

The internal combustion engine (the cylinder injection type of the internal combustion engine) which the invention device is applied to, comprises a spark plug having a spark generation part (an electrode part) and an injector (an in-cylinder fuel injector) having a movable valve body and at least one injection hole.

The injector injects a fuel from the injection hole directly into a cylinder (a combustion chamber) of the engine by moving the valve body. Further, the injector is positioned and configured such that the fuel spray including at least a part of the fuel injected from the injector reaches the spark generation part of the spark plug directly.

Further, the invention device comprises a control part. The control part is configured to:
  execute the fuel injection by the injector; and
  generate a spark for the ignition of the fuel from the spark generation part at a predetermined ignition timing.

Furthermore, the control part is configured to control a disperse parameter for changing (adjusting) the maximum degree of the spread of the fuel spray such that the maximum degree of the spread of the fuel spray under a state where the amount of the fuel adhering to the spark generation part at the ignition timing corresponds to a first amount, is smaller than the maximum degree of the spread of the fuel spray under a state where the amount of the fuel adhering to the spark generation part at the ignition timing corresponds to a second amount smaller than the first amount. It should be noted that the first and second amounts are not predetermined fixed amounts, but are relative amounts.

The degree of the spread of the fuel spray means the degree of the disperse of the fuel spray, the fuel spray angle (the angle of the spread of the fuel spray), the amount of the fuel spray from the injection hole toward the spark generation part, etc. In other words, as the degree of the spread of the fuel spray increases, the degree of the disperse of the fuel spray and the fuel spray angle increase. Further, it can be said that the injector (and the injection hole) and the spark generation part are positioned relative to each other such that the amount of the fuel spray from the injection hole toward the spark generation part increases as the degree of the spread of the fuel spray increases. That is, for example, the spark plug and the injector are positioned and configured such that the spark generation part is located between the fuel sprays each formed by the fuel injected from each of two adjacent injection holes.

Thereby, when the amount of the fuel adhering to the spark generation part at the ignition timing immediately before the ignition timing) is large (that is, for example, when the temperature of the spark generation part is low and thus, the smolder of the spark plug easily occurs due to the ignition of the fuel), the disperse parameter is controlled at a value which decreases the maximum degree of the spread of the fuel spray, compared with the maximum degree of the spread of the fuel spray when the amount of the fuel adhering to the spark generation part at the ignition timing is small. Therefore, the excessive increasing of the degree of the spread of the fuel spray is prevented and thus, the excessive increasing of the amount of the fuel adhering to the spark generation part is prevented. As a result, the fast increasing of the smolder of the spark plug can be prevented.

According to one aspect of the invention device, the control part is configured to use a maximum value of the lift amount of the valve body (that is, the moving amount of the valve body) in the fuel injection as the disperse parameter. Further, the control part is configured to decrease the maximum degree of the spread of the fuel spray by changing the lower limit of the maximum value of the lift amount in a preceding injection which is carried out immediately before the ignition timing such that the lower limit under a state where the adhering fuel amount corresponds to a first amount, is larger than the lower limit under a state where the adhering fuel amount corresponds to a second amount.

As the maximum value of the lift amount of the valve body of the injector in the fuel injection decreases, the penetration force of the injected fuel weakens and the degree of the spread of the fuel spray increases. Therefore, as in the aspect described above, the excessive increasing of the degree of the spread of the fuel spray is prevented by making the lower limit of the maximum value of the lift amount under a state where the amount of the fuel adhering to the spark generation part is large, larger than the lower limit of the maximum value of the lift amount under a state where the amount of the fuel adhering to the spark generation part is small. Thereby, the adhering of the excessive large amount of the fuel to the spark generation part can be prevented when the amount of the fuel adhering to the spark generation part is likely to increase. As a result, the fast increasing of the degree of the smolder of the spark plug can be prevented.

In this case, the control part may be configured to change the lower limit on the basis of the temperature of the spark generation part in consideration of the fact that the fuel adhering amount corresponds to the first amount when the temperature of the spark generation part corresponds to a first temperature while the fuel adhering amount corresponds to the second amount when the temperature of the spark generation part corresponds to a second temperature higher than the first temperature.

Thereby, as the temperature of the spark generation part lowers (that is, as the amount of the fuel adhering to the spark generation part increases), the lower limit of the maximum value of the lift amount increases. As a result, the adhering of the excessive large amount of the fuel to the spark generation part due to the excessive increasing of the degree of the spread of the fuel spray, can be prevented and thus, the fast increasing of the degree of the smolder of the spark plug can be prevented.

Further, in this case, the control part may be configured to acquire the temperature of the spark generation part on the basis of the cooling water temperature (the temperature of the cooling water of the engine). The cooling water temperature has a strong correlation with the temperature of the engine and thus, the cooling water temperature also has a strong correlation with the temperature of the spark generation part of the spark plug. In particular, when the engine operation starts, the temperature of the spark generation part has an extremely strong correlation with the cooling water temperature. Therefore, as in the configuration described above, the adhering of the excessive large amount of the fuel to the spark generation part can be prevented by a simple configuration by changing the lower limit of the maximum value of the lift amount of the valve body on the basis of the cooling water temperature. As a result, the fast increasing of the degree of the smolder of the spark plug can be prevented.

It should be noted that the control part may be configured to use the cooling water temperature as the temperature of the spark generation part, in particular when the engine operation starts or immediately after the engine operation stalls. Further, the control part may be configured to estimate the temperature of the spark generation part on the basis of the cooling water temperature at the engine operation start and the sum of the number of the ignition operation after the engine operation start or the sum of the estimated value of the temperature increase at the spark generation part derived from one combustion after the engine operation start.

Further, the control part may be configured to change the lower limit on the basis of the fuel pressure at the timing of carrying out the preceding injection in consideration of the fact that the fuel adhering amount corresponds to the first amount under a state where the fuel pressure at the timing of carrying out the preceding injection corresponds to a first pressure while the fuel adhering amount corresponds to the second value under a state where the fuel pressure at the timing of carrying out the preceding injection corresponds to a second pressure lower than the first pressure.

As the fuel pressure at the timing of carrying out the preceding injection increases, the strength of the turbulence of the flow of the fuel flowing into the injection hole from the fuel passage of the injector increases and thus, the degree of the spread of the fuel spray increases. Accordingly, as in the configuration described above, the adhering of the excessive large amount of the fuel to the spark generation part due to the excessive increasing of the degree of the spread of the fuel spray can be prevented by changing the lower limit on the basis of the fuel pressure (that is, by increasing the lower limit as the fuel pressure increases). As a result, the fast increasing of the degree of the smolder of the spark plug can be prevented. It should be noted that for example, the control part may be configured to correct the lower limit, which has been changed on the basis of the temperature of the spark generation part, on the basis of the fuel pressure such that the lower limit increases as the fuel pressure at the timing of carrying out the preceding injection increases.

Further, as the amount of the fuel injected by the preceding injection increases, the amount of the fuel reaching and adhering to the spark generation part increases. Accordingly, the control part may be configured to change the lower limit on the basis of the fuel injection amount of the preceding injection in consideration of the fact that the fuel adhering amount corresponds to the first amount under a state where the fuel injection amount of the preceding injection corresponds to a first injection amount while the fuel adhering amount corresponds to the second amount under a state where the fuel injection amount of the preceding injection corresponds to a second injection amount smaller than the first injection amount. Thereby, the adhering of the excessive large amount of the fuel to the spark generation part can be prevented. As a result, the fast increasing of the degree of the smolder of the spark plug can be prevented. It should be noted that for example, the control part may be configured to correct the lower limit, which has been changed on the basis of the temperature of the spark generation part or corrected on the basis of the fuel pressure, on the basis of the fuel injection amount of the preceding injection such that the lower limit increases as the fuel injection amount of the preceding injection increases.

In addition, the control part may be configured to:
acquire a first parameter expressing the degree of the smolder of the spark generation part; and
change the lower limit such that the lower limit increases as the degree of the smolder expressed by the acquired first parameter increases.

The first parameter can be easily acquired by measuring the dielectric breakdown voltage at the timing of carrying out the ignition, the insulation resistance of the spark generation part, etc. According to the configuration described above, the lower limit is changed such that the lower limit increases as the degree of the smolder expressed by the first parameter increases. Therefore, as the degree of the smolder of the spark plug increases, the maximum degree of the spread of the fuel spray can be decreased and thus, the amount of the fuel adhering to the spark generation part can be decreased and the fast increasing of the degree of the smolder can be prevented. It should be noted that for example, the control part may be configured to correct the lower limit, which has been changed on the basis of the temperature of the spark generation part or corrected on the basis of the fuel pressure and/or the fuel injection amount, on the basis of the first parameter such that the lower limit increases as the degree of the smolder expressed by the first parameter increases.

The injector may have a sac chamber in the tip end of the injector, the sac chamber communicating with the injection hole under a state where at least the valve body is moved. Further, the control part may be configured to execute a fuel injection as a pre-injection in addition to the preceding injection by the injector at a timing before the preceding injection.

When the pre-injection is carried out, in some cases, the flow of the fuel occurs in the sac chamber and the flow of the fuel remains (is not reduced) at the timing of carrying out the preceding injection. For convenience, the fuel flow generated by the pre-injection and remaining in the sac chamber at the injection start timing of the preceding injection will be referred to as "the sac chamber fuel flow". When the preceding injection is carried out under a state where the sac chamber fuel flow occurs, the injected fuel is subject to the influence of the sac chamber fuel flow and thus, the degree of the spread of the fuel spray increases. As a result, the amount of the fuel adhering to the spark generation part increases and thus, the fast increasing of the degree of the smolder of the spark plug may occur.

Accordingly, the control part is configured to:

acquire a second parameter having a correlation with the strength of the sac chamber fuel flow; and change the lower limit such that the lower limit increases as the strength of the sac chamber fuel flow expressed by the acquired second parameter increases.

Thereby, as the strength of the sac chamber fuel flow expressed by the second parameter increases, the lower limit increases. Therefore, even when the strength of the sac chamber fuel flow is large, the excessive increasing of the degree of the spread of the fuel spray is prevented and thus, the adhering of the excessive large amount of the fuel to the spark generation part can be prevented. As a result, the fast increasing of the degree of the smolder of the spark plug can be prevented.

The control part may be configured to acquire the second parameter on the basis of the time period between the injection end timing of the pre-injection and the injection start timing of the preceding injection. For convenience, hereinafter, the time period may be referred to as "the interval with respect to the pre-injection". The reason for using the interval with respect to the pre-injection to acquire the second parameter is because the strength of the sac chamber fuel flow increases as the interval with respect to the pre-injection shortens. In this case, the control part may be configured to use the interval with respect to the pre-injection as the second parameter or acquire the second parameter on the basis of the interval with respect to the pre-injection and the other parameter(s) (for example, a fuel injection amount of the pre-injection described below).

Alternatively, the control part may be configured to acquire the second parameter on the basis of the fuel injection amount of the pre-injection. This is because the strength of the sac chamber fuel flow increases as the fuel injection amount of the pre-injection increases. In this case, the control part may be configured to use the fuel injection amount of the pre-injection as the second parameter or acquire the second parameter on the basis of the fuel injection amount of the pre-injection and the other parameter(s) (for example, the maximum value of the lift amount of the valve body in the pre-injection and the fuel pressure at the timing of carrying out the pre-injection).

Alternatively, the control part may be configured to acquire at least one of the pressure of the fuel in the sac chamber during the time period between the injection end timing of the pre-injection and the injection start timing of the preceding injection and the pressure of the fuel upstream of the seat part where the valve body abuts the edge part of the injection hole in the fuel injector during the time period between the injection end timing of the pre-injection and the injection start timing of the preceding injection.

That is, the control part may be configured to estimate (acquire) the strength of the sac chamber fuel flow directly on the basis of the change of the pressure of the fuel in the injector.

According to the other aspect of the invention device, the control part is configured to use the time period between the injection end timing of the pre-injection and the injection start timing of the preceding injection (the interval with respect to the pre-injection) as the disperse parameter. Then, the control part is configured to decrease the maximum degree of the spread of the fuel spray by changing the minimum value of the time period described above (the interval with respect to the pre-injection) such that the minimum value of the time period under a state where the fuel adhering amount corresponds to the first amount, is larger (longer) than the minimum value of the time period under a state where the fuel adhering amount corresponds to the second amount. That is, when the amount of the fuel adhering to the spark generation part is large, the minimum value of the time period between the injection end timing of the pre-injection and the injection start timing of the preceding injection (the interval with respect to the pre-injection) elongates.

As the interval with respect to the pre-injection is small (short), the sac chamber fuel flow is strong and thus, the fuel injected by the preceding injection is strongly subject to the influence of the sac chamber fuel flow. As a result, the degree of the spread of the fuel spray increases. Therefore, as in the aspect described above, even when the amount of the fuel adhering to the spark generation part increases, the excessive increasing of the degree of the spread of the fuel spray can be prevented and thus, the adhering of the excessive large amount of the fuel to the spark generation part can be prevented by changing the minimum value of the interval with respect to the pre-injection such that the minimum value of the interval with respect to the pre-injection under a state where the amount of the fuel adhering to the spark generation part is large, is larger than the minimum value of the interval with respect to the pre-injection such that the minimum value of the interval with respect to the pre-injection under a state where the amount of the fuel adhering to the spark generation part is small. As a result, according to the aspect described above, the fast increasing of the degree of the smolder of the spark plug can be prevented.

In this case, the control part may be configured to change the minimum value of the time period on the basis of the temperature of the spark generation part in consideration of the fact that the fuel adhering amount corresponds to the first amount under a state where the temperature of the spark generation part corresponds to the first temperature while the fuel adhering amount corresponds to the second amount under a state where the temperature of the spark generation part corresponds to the second temperature.

Thereby, as the temperature of the spark generation part lowers (that is, as the amount of the fuel adhering to the spark generation part increases), the minimum value of the interval with respect to the pre-injection increases. As a result, the increased strength of the sac chamber fuel flow can be avoided when the preceding injection is carried out and thus, the adhering of the excessive large amount of the fuel to the spark generation part can be prevented. Therefore, the fast increasing of the degree of the smolder of the spark plug can be prevented.

Further, in this case, the control part may be configured to acquire the temperature of the spark generation part on the basis of the cooling water temperature (the temperature of the cooling water of the engine). As described above, this is because the cooling water temperature has a strong correlation with the temperature of the engine and thus, the cooling water temperature also has a strong correlation with the temperature of the spark generation part of the spark plug.

Further, the control part may be configured to:

acquire the first parameter expressing the degree of the smolder of the spark generation part; and change the minimum value of the time period such that the minimum value of the time period increases as the degree of the smolder expressed by the acquired first parameter increases.

Thereby, the minimum value of the time period is changed such that the minimum value of the time period increases as the degree of the smolder of the spark plug expressed by the first parameter increases. Therefore, as the degree of the smolder of the spark plug increases, the maximum degree of the spread of the fuel spray can be decreased and thus, the amount of the fuel adhering to the spark generation part can be reduced and the fast increasing of the smolder of the spark generation part can be prevented.

The other objects, features and accompanying advantages of the invention can be easily understood from the description of each embodiment of the invention described below with reference to the drawings.

BRIEF DESCRIPTION OF DRAWINGS

FIG. 1 is a partial schematic longitudinal sectional view of one of cylinders of an internal combustion engine which the control device (first device) according to the first embodiment of the invention is applied to.

FIG. 5(A) to 5(C) are partial sectional views showing the tip end pat of the injector shown in FIG. 1 along a plane including the center axis of the injector, respectively

FIG. 13 is a flow chart showing a routine executed by the CPU of the control device (the third device) according to the third embodiment of the invention.

DESCRIPTION OF EMBODIMENTS

Below, the control device for the internal combustion engine according to each of the embodiments of the invention will be described with reference to the drawings. Hereinafter, the control device may be referred to as "the present control device".

First Embodiment

<Configuration>

Figure 1:
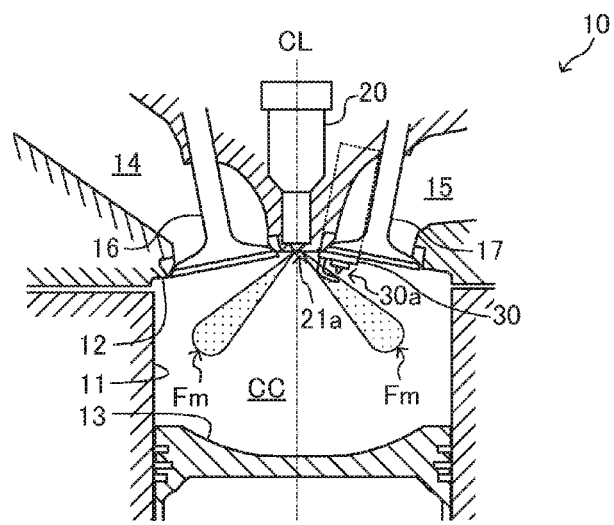

The control device according to the first embodiment of the invention is applied to the internal combustion engine 10 shown in FIG. 1. Hereinafter, the control device according to the first embodiment will be referred to as "the first device". The engine 10 is a piston-reciprocating cylinder-injection (direct-injection) spark-ignition type of the multi-cylinder (in this embodiment, four-cylinder) gasoline engine. The engine 10 has combustion chambers (cylinders) CC.

Each of the combustion chambers CC has a generally cylindrical space defined by the cylinder bore wall face (the side wall face of the cylinder) 11, the cylinder head bottom wall face (the combustion chamber upper wall face) 12, the top wall face 13 of the piston, and the intake and exhaust valves 16 and 17 described below.

Intake and exhaust ports 14 and 15 are formed in the cylinder head part. The ports 14 and 15 communicates with the corresponding combustion chamber CC, respectively. Further, the intake and exhaust valves 16 and 17 are provided in the cylinder head part. The intake valve 16 is configured to open and close the connection part between the corresponding intake port 14 and the corresponding combustion chamber CC by a cam of an intake cam shaft not shown. The exhaust valve 17 is configured to open and close the connection part between the corresponding exhaust port 15 and the corresponding combustion chamber CC by a cam of an exhaust cam shall not shown. Therefore, the combustion chamber CC is configured to be opened and closed by the corresponding intake and exhaust valves 16 and 17.

Actually, a pair of the intake ports 14 are formed corresponding to one combustion chamber CC. The connection part between each of the intake ports 14 and the corresponding combustion chamber CC is opened and closed by each of the corresponding intake valves 16 of a pair. Similarly, a pair of the exhaust ports 15 are formed corresponding to one combustion chamber CC. The connection part between each of the exhaust ports 15 and the corresponding combustion chamber CC is opened and closed by each of the corresponding exhaust valves 17 of a pair.

Further, the engine 10 has injectors (fuel injectors) 20 and ignition plugs 30.

The injectors 20 are provided in the cylinder head part. Fuel injection holes 21a of each of the injector 20 expose to the interior of the corresponding combustion chamber CC at the bottom wall face 12 of the cylinder head part at a generally central area in the corresponding combustion chamber CC (a position adjacent to an area where the center axis CL of the cylinder bore passes through).

Figure 2:
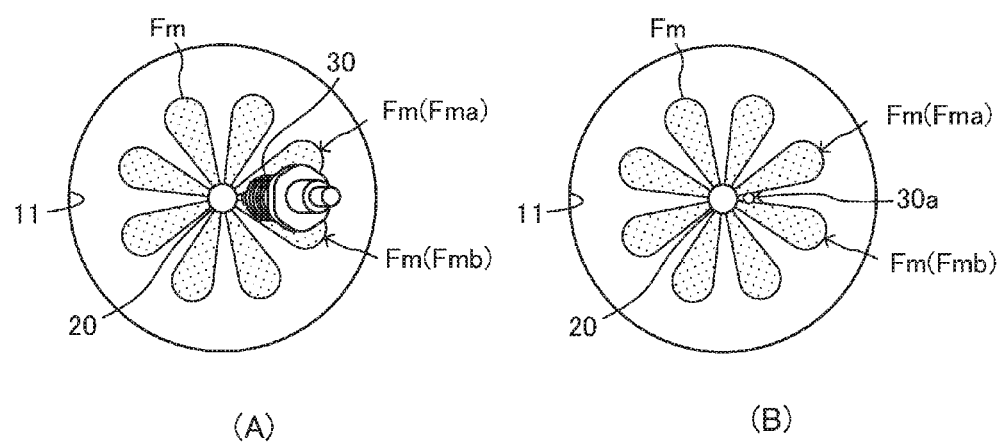
FIGS. 2(A) and 2(B) are plan views showing shapes of the sprays of the injected fuel in the cylinder (the combustion chamber) shown in FIG. 1, respectively.

The ignition plugs 30 are provided in the cylinder head part. Each of the ignition plugs 30 is provided adjacent to the corresponding injector 20. As shown in FIGS. 1, 2(A) and 2(B), a spark generation part (an electrode part including central and ground electrodes) 30a of the ignition plug 30 exposes to the interior of the corresponding combustion chamber CC at the bottom wall face 12 of the cylinder head at a position adjacent to the injection holes 21a of the corresponding injector 20 (at a generally central part of the combustion chamber CC).

Figure 3:
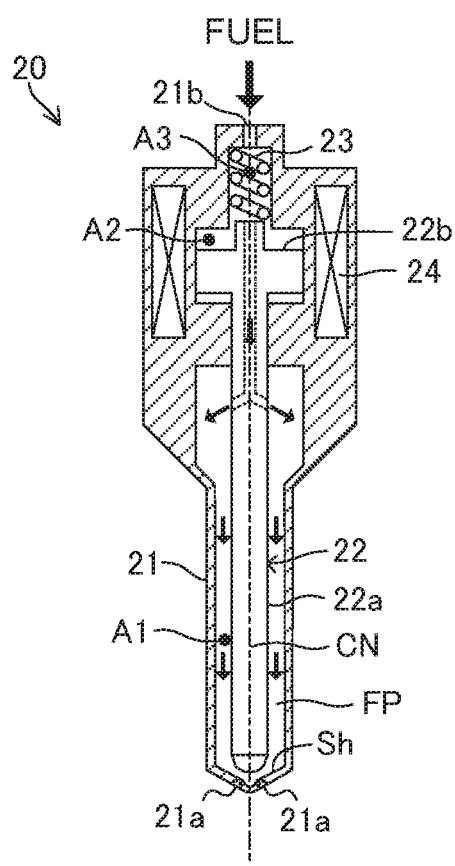
FIG. 3 is a schematic longitudinal sectional view of the injector shown in FIG. 1.

As shown in FIG. 3, the injector 20 has a nozzle body part 21, a needle valve 22 as a valve body, a coil spring 23 and a solenoid 24.

Figure 4:
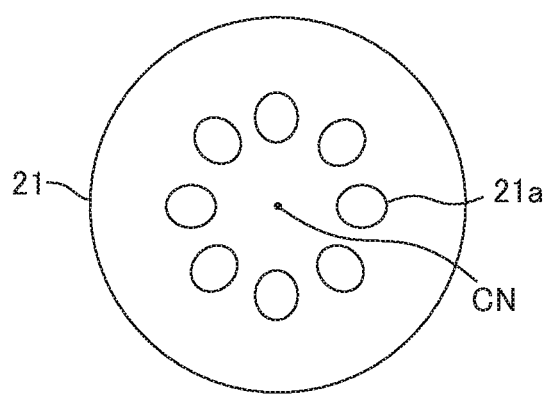
FIG. 4 is a front view of the tip end part of the injector shown in FIG. 1.

Cylindrical spaces A1 to A3 are formed in the nozzle body part 21. The spaces A1 to A3 are formed coaxially about the center axis CN of the nozzle body part 21 and communicate with each other. As shown in FIG. 4, a plurality (in this embodiment, eight) of the injection holes 21a are formed in the tip end part of the nozzle body part 21.

Each of the injection holes 21a is a communication hole which connects the cylindrical space A1 to the exterior of the injector 20. Further, as shown in FIGS. 5(A) to 5(C), a sac chamber Sk for reserving the fuel is formed at the tip end part of the nozzle body part 21 within an area enclosed by the injection holes 21a. The sac chamber Sk has a generally semisphere shape.

As shown in FIG. 4, the injection holes 21a are formed in the tip end part of the nozzle body part 21 such that the injection holes 21a are equiangularly spaced apart from each other in the radially direction along the circle about the center axis CN. Thereby, when the fuel is injected through the injection holes 21a, the fuel sprays Fm are formed each having a shape shown in FIGS. 1 and 2. Each of the fuel sprays Fm has a generally conical shape.

The spark generation part 30a of the ignition plug 30 described above is positioned at a position where the fuel spray Fm including at least a part of the fuel injected from the injection hole 21a directly reaches. In particular, as shown in FIG. 2(B), the sprays Fma and Fmb are formed by the fuel injected toward the spark generation part 30a from two injection holes 21a adjacent to each other. The spark generation part 30a is located between the sprays Fma and Fmb such that a part of the sprays Fma and Fmb can reach the spark generation part 30a. In other words, the spark plug 30 and the injector 20 are positioned and configured such that the spark generation part 30a are located between the fuel sprays Fma and Fmb formed by the fuel injected from the two injection holes 21a adjacent to each other, respectively. As described above, the fuel is guided to the spark generation part 30a by the injection (the fuel spray) by the injector 20 and thus, the engine 10 is referred to as "the spray-guided type of the engine".

Again, referring to FIG. 3, a fuel inlet hole 21b is formed in the proximal end part of the nozzle body part 21. The hole 21b connects the cylindrical space A3 to a fuel delivery pipe (not shown) fluid communication with each other.

The needle valve 22 has a cylinder part 22a and a jaw part 22b. The cylinder part 22a has a small radius and a cylindrical shape. The jaw part 22b has a large radius and a cylindrical shape. The cylinder part 22a has a generally semisphere shape at its tip end. The cylinder part 22a is housed in the cylindrical space A1 at the tip end side of the cylinder part 22a. As a result, a fuel flow passage FP is formed around the lip end side part of the cylinder part 22a. In particular, the fuel flow passage FP is formed between the tip end side part of the cylinder part 22a and the tip end side part of the nozzle body part 21. The jaw 22b is housed in the cylindrical space A2. The needle valve 22 is configured to move along the central axis (the needle valve axis) CN.

Further, a fuel passage is formed in the needle valve 22. The fuel passage connects the proximal end part of the needle valve 22 to the outer peripheral wall face of the tip end side part of the cylinder part 22a in fluid communication with each other. As a result, the fuel flowing from the fuel inlet hole 21b into the cylindrical space A3 flows in the fuel passage of the needle valve 22 and supplied to the fuel flow passage FP.

The coil spring 23 is positioned in the cylindrical space A3. The spring 23 biases the needle valve 22 toward the injection holes 21a (toward the tip end part side of the nozzle body part 21).

The solenoid 24 is provided adjacent to the proximal end part of the nozzle body part 21 around the cylindrical space A2. The solenoid 24 is energized by the injector actuation signal from the ECU 40 described below. When the solenoid 24 is energized, the solenoid 24 generates magnetic force for moving the needle valve 22 toward the fuel inlet hole 21b (toward the proximal end part side of the nozzle body part 21) against the biassing force of the spring 23.

When the solenoid 24 is not energized, the tip end part of the needle valve 22 (the tip end of the cylinder part 22a) is pressed to the tip end part inner periphery wall face (the seat part) Sh of the nozzle body part 21 by the spring 23. The moving amount of the needle valve 22 along the center axis CN of the needle valve 22 under the state described above is defined as zero. Hereinafter the moving amount of the needle valve (the valve body) 22 along the center axis CN may be referred to as "the needle lift amount" or "the lift amount".

As shown in FIG. 5(A), when the needle lift amount is zero, the injection holes 21a are closed by the tip end part of the needle valve 22. As a result, no fuel is supplied from the fuel flow passage FP to the interiors of the injection holes 21a and thus, no fuel is injected. Therefore, the seat part Sh around each of the injection holes 21a (the edge part of each of the injection holes 21a) configures a valve seat for the needle valve 22.

As shown in FIGS. 5(B) and 5(C), when the solenoid 24 is energized and thereby, the needle valve 22 is moved toward the proximal end part of the nozzle body part 21 and the needle lift amount becomes larger than zero, the lip end part of the needle valve 22 moves apart from the seat part Sh. As a result, the injection holes 21a are opened and thus, the fuel flows from the fuel passage FP into the injection holes 21a and then, the fuel is injected via the injection holes 21a, respectively When the needle lift amount becomes a predetermined amount, the jaw part 22b shown in FIG. 3 abuts the wall part which forms the cylindrical space A2 of the nozzle body part 21. As a result, the movement of the needle valve 22 is restricted. The needle lift amount under this state is referred to as "the maximum lift amount or "the ball lift amount". That is, the needle lift amount changes between zero and the maximum lift amount.

The fuel injection under a state where the maximum value of the lift amount of the needle lift amount in the fuel injection reaches the maximum lift amount shown in FIG. 5(C) is referred to as "the full lift injection". On the other hand, the fuel injection under a state where the maximum value of the needle lift amount in the fuel injection is smaller than the maximum lift amount as shown in FIG. 5(B) is referred to as "the partial lift injection". Below, the lift amount between zero and the maximum lift amount may be referred to as "the partial lift amount".

The needle lift amount is controlled by changing the energization time period with respect to the solenoid 24. In other words, the start timing of the fuel injection, the end timing of the fuel injection and the maximum value of the needle lift amount in the fuel injection are controlled on the basis of the timing of energizing the solenoid 24, etc.

Figure 6:
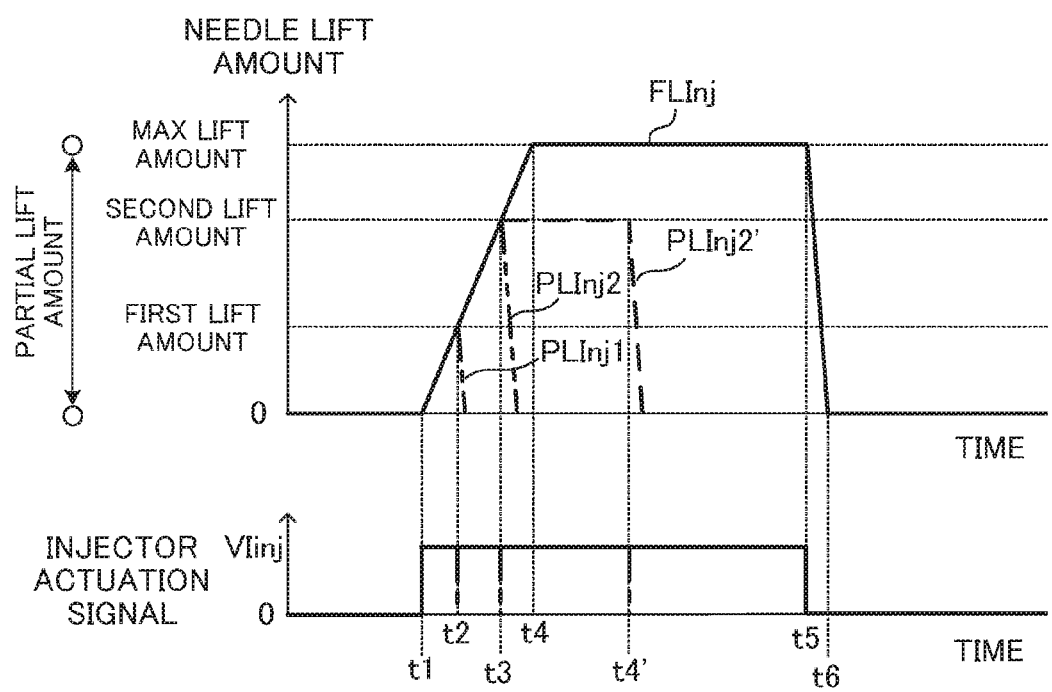
FIG. 6 is a time chart showing the lift amount of the valve body (the needle valve) of the injector shown in FIG. 1 and the injector actuation signal.

For example, when a first amount shown in FIG. 6 is set as the maximum value of the needle lift amount in the fuel injection, the injection (the partial lift injection) is carried out as described below. That is, when the injector actuation signal is changed from zero to a predetermined voltage VInj at the timing t1, the valve body 22 starts to move. Then, the lift amount of the valve body 22 reaches a first lift amount smaller than the maximum lift amount at the timing t2. At this timing t2, the injector actuation signal is changed from the predetermined voltage VInj to zero. The first device memorizes the relationship between the lift amount and the time period between the timings t1 and t2 in the ROM (the same applies hereinafter). That is, the first device manages the injector actuation signal in terms of the time. As a result, as shown by the dashed line PLInj1, the needle lift amount decreases from the first lift amount and then, reaches zero immediately after the timing t2. The fuel is injected between the timing t1 and the timing immediately after the timing t2 (substantially, between the timings t1 and t2). In this case, the amount of the injected fuel corresponds to a value having a correlation with the area (the triangle area) enclosed by the wave line of the needle lift amount shown in FIG. 6. Actually, the valve body 22 starts to move at the timing when an ineffective injection time period td elapses after the timing of changing the injector actuation signal from zero to the predetermined voltage VInj. However, the ineffective injection time period td is extremely short and thus, the period td will be omitted in the following description.

Similarly, when the injector actuation signal is changed to the predetermined voltage VInj at the timing t1 and then, the injector actuation signal is changed to zero at the timing t3 after the timing t2, the partial lift injection under a state that a second lift amount is set as the maximum value of the needle lift amount, is carried out (refer to the two-dot chain line PLInj2). In this case, the fuel is injected between the timing t1 and the timing immediately after the timing t3 (substantially, between the timings t1 and t3).

As shown in the broken line PLInj2', the first device can carry out the fuel injection under a state where the maximum value of the needle lift amount is maintained at a constant value (a constant partial lift amount) for a predetermined time period. In this case, the first device controls the injector actuation signal such that the injector actuation signal alternates between the predetermined voltage VInj and zero at an extremely short cycle with a predetermined duty ratio after the timing (the timing t3) when the needle lift amount reaches the target maximum value or after the timing immediately before the needle lift amount reaches the target maximum value. That is, the first device balances the magnetic force generated by the solenoid 24 with the biassing force of the spring 23. Then, when a predetermined time period elapses (at the timing t4'), the injector actuation signal is changed to zero. In this case, the fuel is injected between the timing t1 and the timing immediately after the timing t4' (substantially, between the timings t1 and t4').

The full lift injection is carried out as described below. That is, as shown in FIG. 6, when the injector actuation signal is changed from zero to a predetermined voltage VInj at the timing t1, the valve body 22 starts to move. Then, the lift amount of the valve body 22 reaches the maximum lift amount at the timing t4 and thus, the movement of the valve body 22 is restricted. Therefore, the needle lift amount is maintained at the maximum lift amount after the timing t4. When the injector actuation signal is changed from the predetermined value VInj to zero at the timing t5, the needle lift amount rapidly decreases from the maximum lift amount and then, the needle lift amount reaches zero at the timing t6. The fuel is injected between the timings t1 and t6 (substantially, between the timings t1 and t5).

As shown in FIG. 5(B), as the maximum value of the needle lift amount in the fuel injection decreases, the fluid flow area between the tip end part of the needle valve 22 and the seat part Sh decreases. Therefore, the pressure of the fuel reaching the injection holes 21a from the fuel passage FP lowers. Further, the turbulence occurs in the fuel flowing into the sac chamber Sk and the injection holes 21a As a result, the degree of the spread of the fuel spray in the combustion chamber CC formed by the partial lift injection (the degree of the disperse of the fuel spray or the fuel spray angle θ) increases. Further, as the maximum value of the needle lift amount decreases even in the partial lift injection, the degree of the spread of the fuel spray increases. Thereby, as the maximum value of the needle lift amount in the fuel injection decreases, the amount of the fuel (the fuel droplet) reaching the spark generation part 30a of the spark plug 30 increases. Thus, the amount of the fuel adhering to the spark generation part 30a (the adhering fuel amount) increases. As described above, it can be said that the maximum value of the needle lift amount in the fuel injection is a disperse parameter which changes the degree of the spread of the fuel spray.

Figure 7:
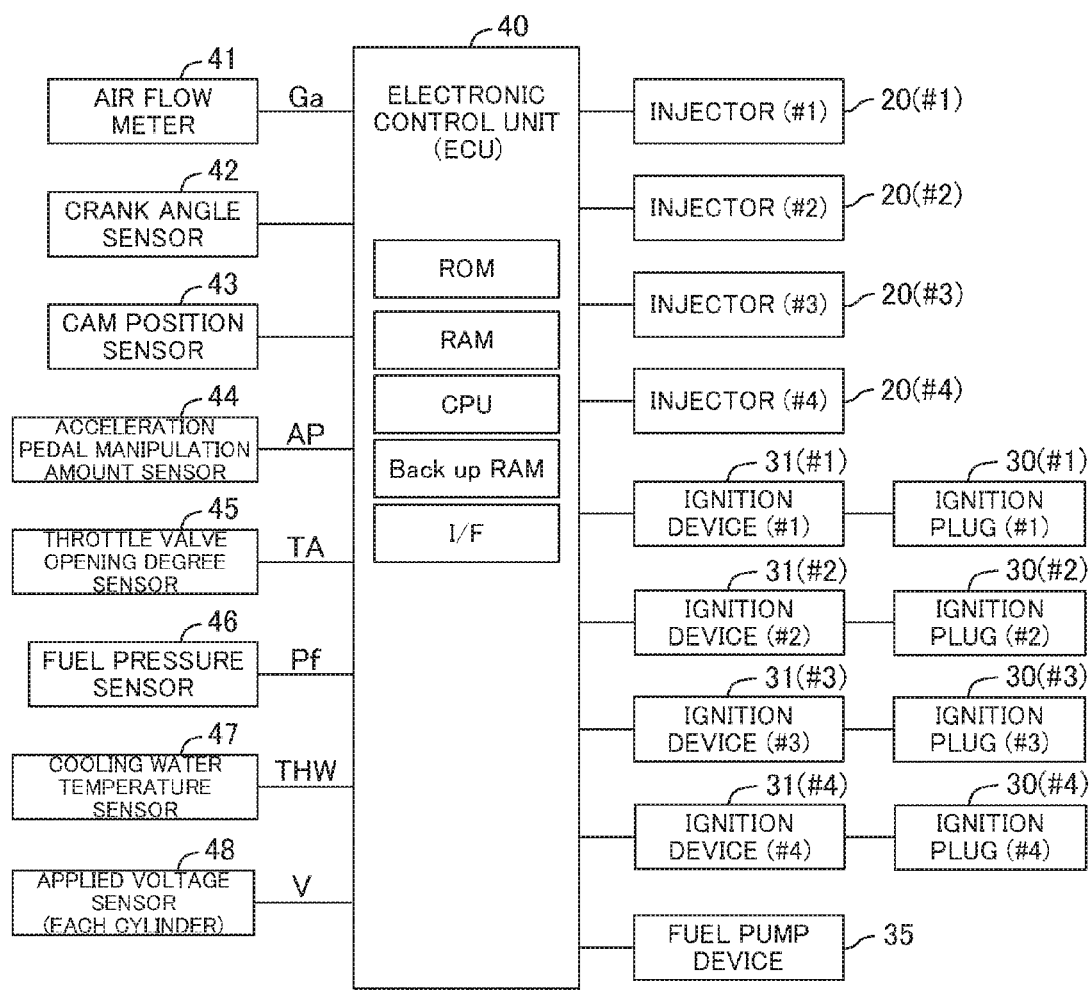
FIG. 7 is a block diagram of the electronic control unit of the first device.

The first device includes an electronic control unit (the control part) 40 shown in FIG. 7. Hereinafter, the electronic control unit 40 is expressed as "the ECU 40". The ECU 40 is an electronic circuit device including a well-known microcomputer having the CPU, the ROM for memorizing instructions (the programs), the lookup tables, etc., the RAM, the backup RAM, the interface, etc. The ECU 40 receives detection signals from sensors described below.

An air flow meter 41 (an air flow meter incorporating an intake air temperature sensor) for detecting an intake air amount (an air mass flow rate) which is an amount (a mass flow rate) of the air suctioned into the combustion chamber CC of the engine 10 and the intake temperature THA which is a temperature of the air suctioned into the combustion chamber CC.

A crank angle sensor 42 for generating a pulse every the crank shaft not shown rotates by a predetermined angle width.

A cam position sensor 43 for generating a pulse every the cam shaft not shown rotates by a predetermined angle width.

An acceleration pedal manipulation amount sensor 44 for detecting the manipulation amount AP of the acceleration pedal not shown.

A throttle valve opening degree sensor 45 for detecting the opening degree TA of the throttle valve not shown.

A fuel pressure sensor 46 which is provided in the delivery pipe (the fuel delivery pipe) for supplying the fuel to the injectors 20 and detects the fuel pressure Pf in the delivery pipe.

A cooling water temperature sensor 47 for detecting the cooling water temperature THW of the engine 10.

Applied voltage sensors 48 for measuring the voltages (the applied voltages) V applied by the ignition device 31 of each of the cylinders CC to the corresponding ignition plug 30.

The ECU 40 is configured to acquire the absolute crank angle CA of each of the cylinders CC on the basis of the signals from the crank angle sensor 42 and the cam position sensor 43. Further, the ECU 40 is configured to acquire the engine speed NE on the basis of the signal from the crank angle sensor 42. Furthermore, the ECU 40 may be configured to receive the signal PV from an in-injector pressure sensor for detecting the pressure in the sac chamber Sk or the fuel flow passage FP of each of the injectors 20. In addition, the ECU 40 may be configured to receive the signal from a resistance detection device for measuring the insulation resistance of each of the ignition plugs 30 (the spark generation parts 30a).

The ECU 40 is configured to send the actuation signals to actuators described below, respectively. Below, N is one of integers of 1 to 4. "#N" means Nth cylinder.

The injector 20(#N) of the Nth cylinder (#N).
The ignition device 31(#N) of the Nth cylinder (#N).
The fuel pump device 35.

Each of the ignition device 31(#N) includes an ignitor and a coil not shown. Each of the ignition device 31(#N) is configured to generate a high voltage on the basis of the ignition signal (the actuation signal) generated at the ignition timing SA and apply the generated high voltage to the corresponding ignition plug 30(#N) of the Nth cylinder (#N). By this application of the high voltage to the ignition plug 30(#N), the corresponding spark generation part 30a (#N) of the ignition plug 30(#N) of the Nth cylinder (#N) generates a spark for the ignition of the fuel.

The fuel pump device 35 includes a fuel pump and a fuel pressure regulation valve not shown. The fuel discharged from the fuel pump is supplied to the injectors 20(#N) via the fuel delivery pipe not shown. The ECU 40 sends the actuation signal (the instruction signal) to the fuel pressure regulation valve to change the pressure of the fuel supplied to the injectors 20(#N).

As described above, the ECU 40 sends the injector actuation signal to the electromagnetic mechanism of each of the injectors 20(#N). When the injector actuation signal is zero, the solenoid 24 is not energized. On the other hand, when the injector actuation signal is the predetermined voltage VInj the solenoid 24 is energized.

<Summary of Control>

Figure 8:
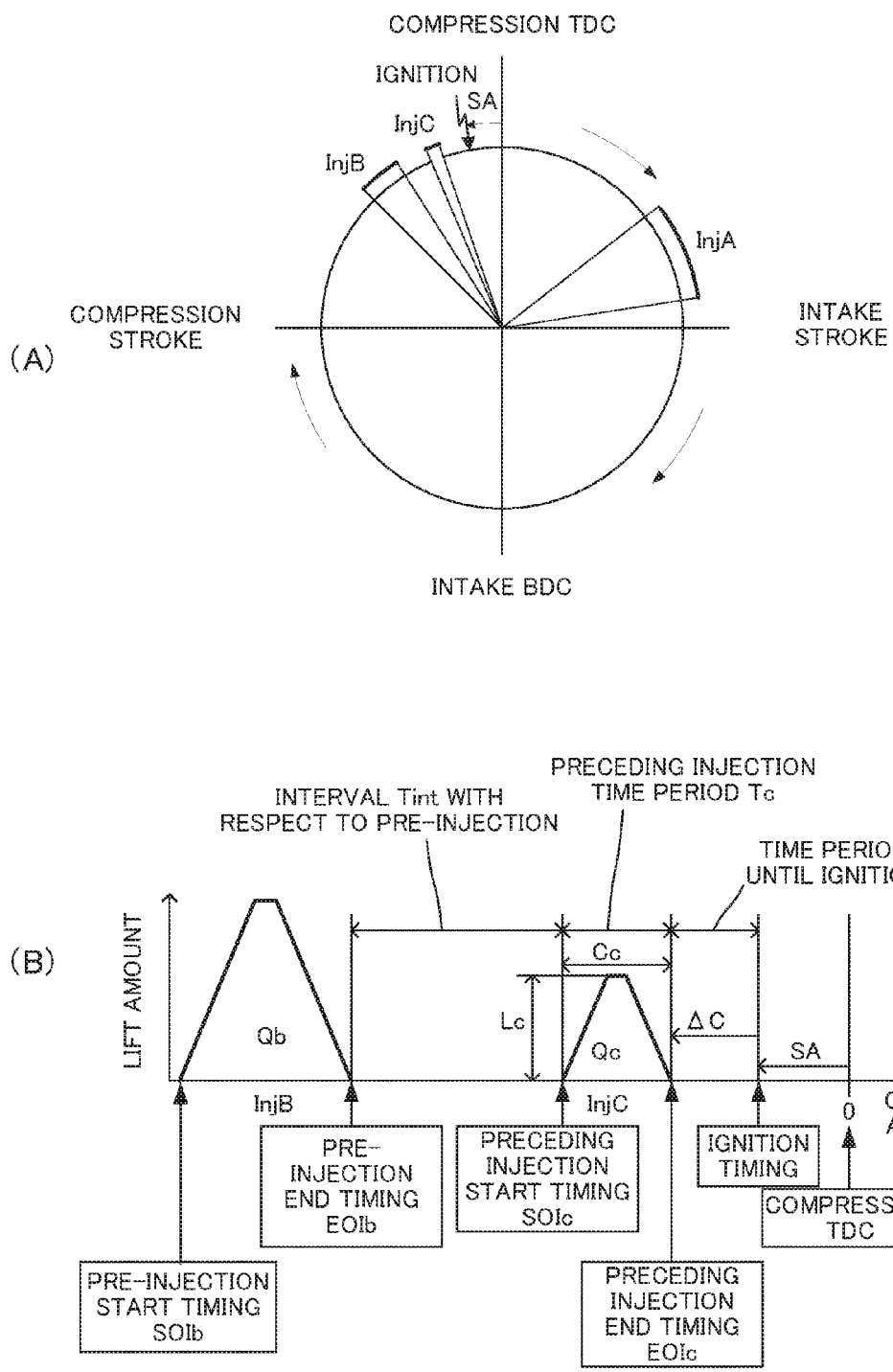
FIG. 8(A) is a view showing a timing of each of the fuel injections and FIG. 8(B) is a time chart showing changes of the needle lift amounts in the preceding injection and the pre-injection.

Next, the summary of the control of the first device will be described. As shown in FIG. 8(A), the first device carries out three fuel injections described below in one combustion cycle (that is, in one cycle in each of the cylinders).

A. Intake stroke injection InjA carried out in the intake stroke.

B. Pre-injection NB carried out in the latter half of the compression stroke.

C. Preceding injection InjC carried out after the pre-injection InjB and immediately before the ignition timing SA.

It should be noted that the intake stroke injection InjA and/or the pre-injection InjB may not be carried out when the operation state of the engine 10 corresponds to a pre-determined state. Further, the intake stroke injection InjA may be realized by two or more fuel injections when the operation state of the engine 10 corresponds to a predetermined state.

The intake stroke injection InjA is realized by the full lift injection. The pre-injection InjB is realized by the full lift injection (or the partial lift injection). The preceding injection InjC is realized by the partial lift injection.

The first device determines an amount Qc of the fuel injected by the preceding injection InjC on the basis of parameters expressing the operation state of the engine 10, etc. (for example, the required torque Tqreq, the engine speed NE and the intake air temperature THA). Hereinafter, the amount Qc may be referred to as "the preceding fuel injection amount". At the same time, the first device determines the maximum value Lc of the needle lift amount in the preceding injection InjC shown in FIG. 8(B) on the basis of the engine speed NE.

Next, the first device estimates the temperature Tplug of the spark generation part 30a on the basis of the cooling water temperature THW0 at the engine operation start and the ignition number Nc after the engine operation start. For example, the temperature Tplug is estimated (acquired) by the expression described below. However, the temperature Tplug is limited to a temperature higher than or equal to the maximum temperature Tmax. The expression is based on the fact that the temperature Tplug of the spark generation part 30a at the engine operation start can be deemed to generally be equal to the cooling water temperature THW0 and the temperature Tplug of the spark generation part 30a after the engine operation start increases as the ignition number Nc increases. The cooling water temperature THW0 in the expression described below may be the present cooling water temperature TIM.

$$\text{Spark generation part temperature } T\text{plug} = THW0 + a*Nc$$

("a" is zero or a constant larger than zero.)

The first device determines a lower limit Llolmt of the maximum value Lc of the needle lift amount in the preceding injection InjC on the basis of the estimated (acquired) spark generation part temperature Tplug. In particular, as the spark generation part temperature Tplug increases, the amount of the fuel (the fuel spray) adhering to the spark generation part 30a decreases. In other words, as the spark generation part temperature Tplug lowers, the amount of the fuel adhering to the spark generation part 30a at the ignition timing SA increases. Accordingly, the first device determines the lower limit Llolmt such that the degree of the spread of the fuel spray (the degree of the disperse of the fuel spray) decreases as the estimated spark generation part temperature Tplug lowers. That is, the first device determines the lower limit Llolmt such that the lower limit Llolmt increases as the estimated spark generation part temperature Tplug lowers.

As the fuel pressure Pfc at the timing of carrying out the preceding injection InjC increases, the strength of the turbulence of the flow of the fuel at the border part between the fuel flow passage FP and each of the injection holes 21a in the injector 20 increases. As a result, as the fuel pressure Pfc increases, the degree of the spread of the fuel spray increases and thus, the amount of the fuel adhering to the spark generation part 30a increases even when the other conditions are the same. In other words, as the fuel pressure Pfc increases, the amount of the fuel adhering to the spark generation part 30a at the ignition timing SA increases. Accordingly, the first device changes (corrects) the lower limit Llolmt such that the lower limit Llolmt determined on the basis of the spark generation part temperature Tplug increases as the fuel pressure Pfc increases.

Further, even when the other conditions are the same, the amount of the fuel adhering to the spark generation part 30a at the ignition timing SA increases as the fuel injection amount Qc of the preceding injection InjC increases. Accordingly, the first device changes (corrects) the lower limit Llolmt such that the lower limit Llolmt determined on the basis of the spark generation part temperature Tplug increases as the fuel injection amount Qc increases.

In addition, the first device acquires a first parameter P1 expressing the degree of the smolder of the spark generation part 30a. In particular the first device acquires the applied voltage (that is, the insulation breakdown voltage of the spark generation part 30a) Vk immediately before the spark discharge is generated and the applied voltage changes rapidly as the first parameter P1 by managing the voltage V applied to the spark generation part 30a. In this case, the first parameter P1 (the insulation breakdown voltage Vk of the spark generation part 30*a*) decreases as the degree of the smolder of the spark generation part 30*a* increases (the smolder progresses or the smolder strengthens).

Accordingly, the first device changes the lower limit Llolmt such that the lower limit Llolmt increases as the degree of the smolder of the spark generation part 30*a* indicated by the acquired first parameter P1 increases.

Further, the first device carries out the preceding injection InjC while limiting the maximum value Lc of the needle lift amount to a value larger than or equal to the lower limit Llolmt determined as described above. As a result, the ignition is carried out under a state that the amount of the fuel adhering to the spark generation part 30*a* is prevented from being excessively large and thus, the fast increasing of the degree of the smolder of the ignition plug 30 can be prevented. It should be noted that the first device determines the injection end timing EOIc of the preceding injection InjC on the basis of the engine speed NE. Then, the first device determines the fuel injection time period Tc and the injection start timing SOIc of the preceding injection InjC so as to inject the fuel injection amount Qc of the fuel by the preceding injection InjC wider a state where the maximum value Lc is limited to the lower limit Llolmt. Then, the first device sends the injector actuation signal corresponding to the fuel injection time period and the injection start timing SOIc to the injector 20. The summary of the actuation of the first device was described.

<Actual Actuation of First Device>

Figure 9:
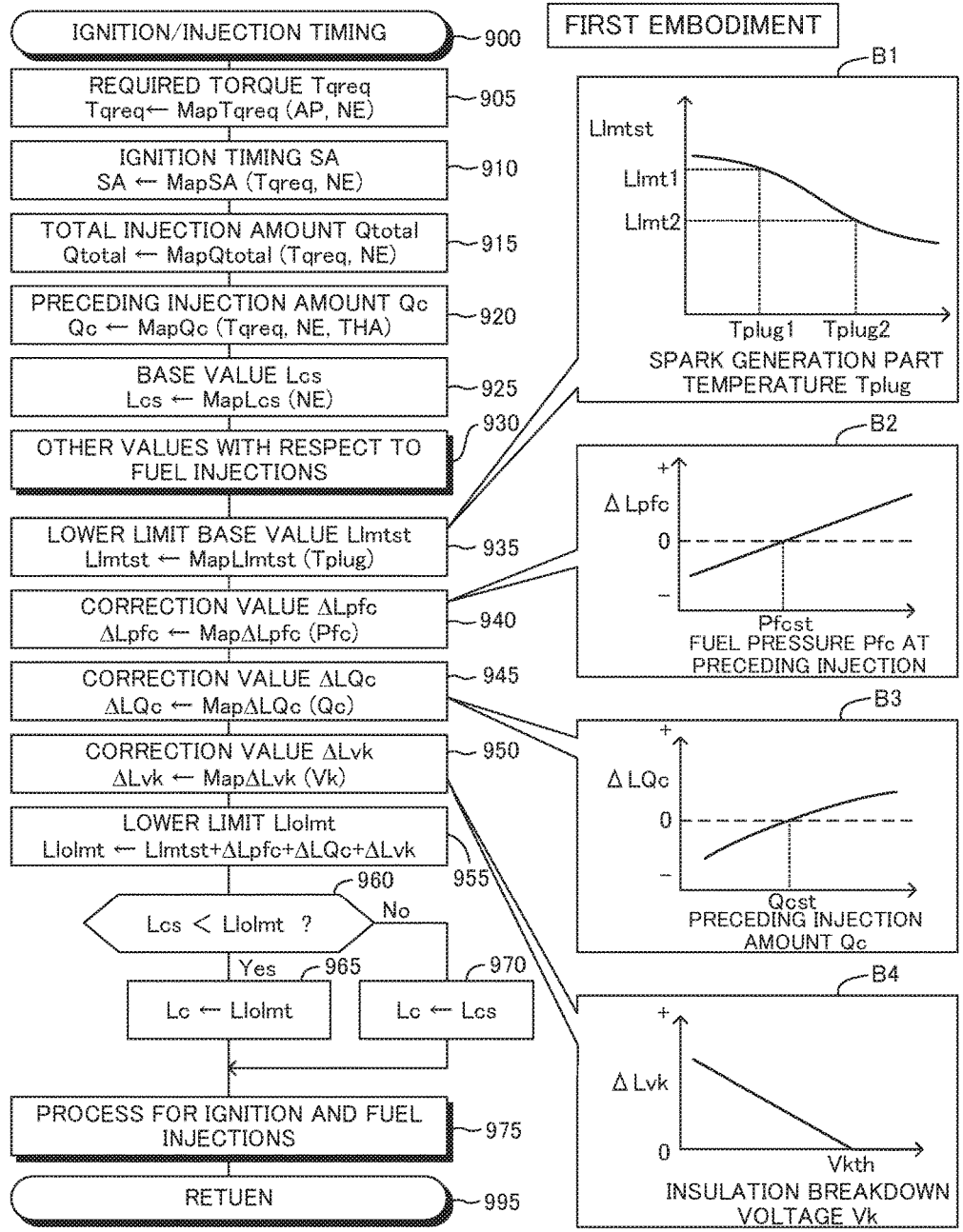
FIG. 9 is a flow chart showing a routine executed by the CPU of the electronic control unit shown in FIG. 7.

The CPU of the ECU 40 is configured to execute a process of the ignition/injection control routine shown in FIG. 9 by a flow chart for an optional cylinder every the crank angle of the optional cylinder corresponds to the intake top dead center of the optional cylinder.

Therefore, when the crank angle of a certain cylinder (a particular cylinder (#N) corresponds to the intake top dead center of the particular cylinder, the CPU starts the process from the step 900 and executes the processes of the steps 905 to 955 in sequence. Then, the CPU proceeds to the step 960.

Step 905: The CPU determines the required torque (the torque required to be output from the engine 10) Tqreq by applying the acceleration pedal manipulation amount AP and the engine speed NE to a lookup table MapTqreq(AP, NE). According to the table MapTqreq(AP, NE), the determined required torque Tqreq increases as the acceleration pedal manipulation amount AP increases under a state where the engine speed NE is maintained at a predetermined constant engine speed.

Step 910: The CPU determines the ignition timing SA by applying the required torque Tqreq and the engine speed NE to a lookup table MapSA(Tqreq, NE). According to the table MapSA(Tqreq, NE), the MBT (Minimum Spark Advance For Best Torque) is set as the ignition timing SA within a range where no knocking occurs. It should be noted that the various timing including the ignition timing SA are determined as a crank angle before the compression top dead center. Therefore, as the ignition timing SA increases, the ignition timing advances (refer to FIGS. 8(A) and 8(B)).

Step 915: The CPU calculates a sum Qtotal of the amounts of the fuel to be supplied to (injected into) the particular cylinder in the combustion cycle of the particular cylinder. Hereinafter, the sum Qtotal of the amounts of the fuel will be referred to as "the total injection amount". In particular, the CPU determines the total injection amount Qtotal by applying the required torque Tqreq and the engine speed NE to a lookup table MapQtotal(Tqreq, NE). According to the table MapQtotal(Tqreq, NE), as the required torque Tqreq increases, the total injection amount Qtotal increases under a state where the engine speed NE is maintained at a predetermined constant engine speed.

Step 920: The CPU determines the preceding injection amount (the amount of the fuel injected by the preceding injection InjC) Qc (refer to FIG. 8(B)). In particular, the CPU determines the preceding injection amount Qc by applying the required torque Tqreq, the engine speed NE and the intake air temperature THA to a lookup table MapQc (Tqreq, NE, THA).

According to the table MapQc(Tqreq, NE, THA), the determined preceding injection amount Qc increases as the required torque Tqreq (that is, a value depending on the cylinder air amount suctioned into the cylinder CC in the intake stroke) increases. Further, according to the table MapQc(Tqreq, NE, THA), the determined preceding injection amount Qc increases as the engine speed NE decreases and the determined preceding injection amount Qc increases as the intake air temperature THA lowers. Furthermore, the preceding injection amount Qc is set such that the preceding injection amount Qc is about 20 percent of the total injection amount Qtotal. It should be noted that the preceding injection amount Qc may be determined on the basis of other parameters expressing the engine operation state (for example, the EGR rate, the cooling water temperature THW, etc.).

Step 925: The CPU determines a base value Lcs of the maximum value of the needle lift amount in the preceding injection InjC on the basis of the engine speed NE. In particular, the CPU determines the base value Lcs by applying the engine speed NE to a lookup table MapLcs(NE). According to the table MapLcs(NE), the determined base value Lcs decreases as the engine speed NE decreases.

Step 930: The CPU determines the other values with respect to the fuel injection described below as follows. It should be noted that according to this embodiment, the intake stroke injection InjA and the pre-injection InjB are realized by the full lift injection.

The CPU determines the injection start and end timings SQL and EOIa of the intake stroke injection InjA, respectively. In particular, the CPU acquires 60 to 70 percent of the total injection amount Qtotal as the intake stroke injection amount (the injection amount of the intake stroke injection InjA) Qa. The CPU determines a predetermined timing around the 60 degrees after the intake top dead center as the injection start timing SOIa of the intake stroke injection InjA. The CPU calculates the fuel injection lime period Ta of the intake stroke injection InjA on the basis of the intake stroke injection amount Qa and the fuel pressure Pf, converts the fuel injection time period Ta to corresponding crank angle width CAa on the basis of the engine speed NE and determines a crank angle obtained by subtracting the corresponding crank angle width CAa from the injection start timing SOIa as the injection end timing EOIa of the intake stroke injection InjA (EOIa=SOIa−CAa).

The CPU determines the injection start and end tunings SOIb and EOIb of the pre-injection InjB, respectively. In particular, the CPU acquires a value obtained by subtracting the intake stroke injection and preceding injection amounts Qa and Qc from the total injection amount Qtotal as the pre-injection amount (the injection amount of the pre-injection InjB) Qb (Qb=Qtotal−(Q+Qc)). The CPU determines the injection start timing SOIb of the pre-injection InjB such that the injection start timing SOIb advances as the cooling water temperature THW lowers to avoid the excessive increasing of the amount of the fuel adhering to the top wall face 13 of the piston. The CPU calculates the fuel injection time period Tb of the pre-injection InjB on the basis of the pre-injection amount Qb and the fuel pressure Pf, converts the fuel injection time period Tb to a corresponding crank angle width CAb on the basis of the engine speed NE and determines a crank angle obtained by subtracting the corresponding crank angle width CAb from the injection start timing SOIb as the injection end timing EOIb of the pre-injection InjB (EOIb=SOIb−CAb) (refer to FIG. 8(B)).

Step 935: The CPU determines a lower limit base value (a base value of the lower limit) Llmtst of the maximum value of the needle lift amount in the preceding injection InjC on the basis of the spark generation part temperature Tplug which is estimated separately as described above. In particular, the CPU determines the lower limit base value Llmtst by applying the spark generation part temperature Tplug to a lookup table MapLlmtstaplug) shown in the block B1 of FIG. 9.

According to the table MapLlmtst(Tplug), the determined lower limit base value Llmtst decreases as the spark generation part temperature Tplug increases (that is, as the amount of the fuel adhering to the spark generation part 30a at the ignition timing SA decreases). The lower limit base value Llmtst is a base value of the lower limit Llolmt of the maximum value of the needle lift amount in the preceding injection InjC calculated at the step 955 described below. Therefore, such an acquirement of the lower limit base value Llmtst means that the increasing of the degree of the spread of the fuel spray can be permissible as the spark generation part temperature Tplug increases.

Step 940: The CPU estimates (acquires) the fuel pressure Pfc at the start timing (the injection start timing SOIc) of the preceding injection InjC on the basis of the present fuel pressure Pf, the present intake stroke injection amount Qa and the present pre-injection amount Qb. In particular, the CPU estimates the fuel pressure Pfc by applying the present fuel pressure Pf, the present intake stroke injection amount Qa and the present pre-injection amount Qb to a lookup table MapPfc(Pf, Qa, Qb). According to the map MapPfc(Pf, Qa, Qb), the determined fuel pressure Pfc increases as the present fuel pressure Pf increases, the determined fuel pressure Pfc decreases as the intake stroke injection amount Qa increases and the determined fuel pressure Pfc decreases as the pre-injection amount Qb increases.

Next, the CPU calculates a fuel pressure correction value (a correction value for correcting the lower limit base value Llmtst) ΔLpfc by applying the estimated (acquired) fuel pressure Pfc to a lookup table MapΔLpfc(Pfc) shown in the block B2 of FIG. 9. According to the table MapΔLpfc(Pfc), the calculated correction value ΔLpfc increases as the estimated (acquired) fuel pressure Pfc increases. It should be noted that the correction value ΔLpfc is zero when the estimated (acquired) fuel pressure Pfc corresponds to the base pressure Pfcst.

The correction value ΔLpfc is added to the lower limit base value Llmtst to acquire the lower limit Llolmt of the maximum value of the needle lift amount at the step 955 as described below. Therefore, such as acquisition of the correction value ΔLpfc means that the lower limit Llolmt increases as the fuel pressure Pfc increases.

Step 945: The CPU calculates a preceding injection amount correction value (a correction value for correcting the lower limit base value Llmtst) ΔLQc by applying the preceding injection amount Qc to a lookup table MapΔLQc (Qc) shown in the block 133 of FIG. 9. According to the table MapΔLQc(Qc), the calculated correction value ΔLQc increases as the preceding injection amount Qc increases. It should be noted that the correction value ΔLQc is zero when the preceding injection amount Qc corresponds to the base preceding injection amount Qcst.

The correction value ΔLQc is added to the lower limit base value Llmtst to acquire the lower limit Llolmt of the maximum value of the needle lift amount at the step 955 as described below. Therefore, such an acquisition of the correction value ΔLQc means that the lower limit value Llolmt increases as the preceding injection amount Qc increases.

Step 950: The CPU reads out the insulation breakdown voltage Vk of the spark plug 30(#N) of the particular cylinder (#N). The insulation breakdown voltage Vk is measured (acquired) as a voltage V immediately before the voltage V starts to rapidly and extremely largely oscillate (that is, the spark is generated by the spark generation part 30a(#N)) by managing the voltage V applied to the spark plug 30(#N) by the spark device 31(#N) through a routine not shown. When the degree of the smolder of the spark plug 30 increases, the insulation breakdown voltage Vk lowers. Therefore, the insulation breakdown voltage Vk is a parameter expressing the degree of the smolder of the spark plug 30. Hereinafter, for convenience, the parameter will be referred to as "the first parameter".

Next, the CPU calculates a plug smolder degree correction value (a correction value for correcting the lower limit base value Llmtst) ΔLvk by applying the read out insulation breakdown voltage Vk to a lookup table MapΔLvk(Vk) shown in the block B4 of FIG. 9. According to the table MapΔLvk(Vk), the calculated correction value ΔLvk increases as the insulation breakdown voltage Vk lowers (that is, as the degree of the smolder of the spark plug 30 expressed by the first parameter increases (or the smolder of the spark plug 30 progresses or strengthens). It should be noted that the correction value ΔLvk is zero when the insulation breakdown voltage Vk is larger than or equal to the base insulation breakdown voltage Vkth. The correction value ΔLvk is added to the lower limit base value Llmtst to acquire the lower limit Llolmt of the maximum value of the needle lift amount at the step 955 as described below. Therefore, such an acquisition of the correction value ΔLvk means that the lower limit Llolmt increases as the insulation breakdown voltage Vk lowers.

Step 955: The CPU acquires a sum of the lower limit base value Llmtst, the fuel pressure correction value ΔLpfc, the preceding injection amount correction value ΔLQc and the plug smolder degree correction value ΔLvk as the lower limit Llolmt of the maximum value of the needle lift amount in the preceding injection InjC. That is, the lower limit base value Llmtst is corrected by the correction values ΔLpfc, ΔLQc and ΔLvk. As a result, the lower limit Llolmt increases as the spark generation part temperature Tplug lowers, the lower limit Llolmt increases as the fuel pressure Pfc at the timing of carrying out the preceding injection injC increases, the lower limit Llolmt increases as the preceding injection amount Qc increases and the lower limit Llolmt increases as the insulation breakdown voltage Vk lowers (that is, as the degree of the smolder of the spark plug 30 increases).

Next, the CPU proceeds to the step 960 where the CPU judges if the base value Lcs of the maximum value of the needle lift amount in the preceding injection InjC acquired at the step 925 is smaller than the lower limit Llolmt of the maximum value of the needle lift amount.

When the base value Lcs is smaller than the lower limit Llolmt, the CPU judges "Yes" at the step 960 and proceeds to the step 965 where the CPU sets the lower limit Llolmt as the maximum value Lc of the needle lift amount in the preceding injection InjC. That is, the maximum value Lc is the lower limit Llolmt. Then, the CPU proceeds to the step 975.

On the other hand, when the base value Lcs is larger than or equal to the lower limit Llolmt, the CPU judges "No" at the step 960 and proceeds to the step 970 where the CPU sets the base value Lcs as the maximum value Lc of the needle lift amount in the preceding injection InjC. That is, the maximum value Lc is the base value Lcs.

Then, the CPU proceeds to the step 975 where the CPU executes a process for executing the ignition at the ignition timing SA, the intake stroke injection InjA, the pre-injection InjB and the preceding injection InjC, respectively.

It should be noted that the CPU determines the injection end timing EOIc of the preceding injection InjC by applying the engine speed NE, the fuel pressure Pfc and the cooling water temperature THW to a lookup table MapEOIc(NE, Pfc, THW). Next, the CPU calculates a time period Tc (the preceding injection time period) necessary to inject the preceding injection amount Qc of the fuel under a state where the value Lc is set as the maximum value of the needle lift amount on the basis of the maximum value Lc, the preceding injection amount Qc and the fuel pressure Pfc. Then, the CPU converts the preceding injection time period Tc to a corresponding crank angle width CAc on the basis of the engine speed NE and determines a crank angle obtained by adding the corresponding crank angle width CAc to the injection end timing EOIc as the injection start timing SOIc of the preceding injection Injc (SOIc=EOIc+CAc). Then, the CPU proceeds to the step 995 where the CPU terminates the routine.

As described above, the control part (the ECU 40) of the first device is configured to use the maximum value Lc of the needle lift amount in the preceding injection InjC as a disperse parameter for changing the degree of the spread of the fuel spray (the degree of the disperse of the fuel spray) including the fuel injected by the preceding injection InjC (refer to FIGS. 5, 8(B) and 9).

Further, the control part is configured to control the disperse parameter for changing the degree of the spread of the fuel spray (that is, the lower limit Llolmt of the maximum value Lc of the needle lift amount) such that the maximum degree of the spread of the fuel spray in the preceding injection InjC under a state where the amount of the fuel adhering to the spark generation part 30a at the ignition timing SA corresponds to a first amount, is smaller than the maximum degree of the spread of the fuel spray in the preceding injection InjC that under a state where the amount of the fuel adhering to the spark generation part 30a at the ignition timing SA corresponds to a second amount smaller than the first amount (refer to the steps 925 and 935 to 970 of FIG. 9).

Furthermore, the control part is configured to change the lower limit Llolmt depending on the temperature of the spark generation part 30a in consideration of the fact that the adhering amount of the fuel is the first amount under a state where the temperature Tplug of the spark generation part 30a corresponds to a first temperature (refer to "Tplug1" in the block B1 of FIG. 9) and the adhering amount of the fuel is the second amount under a state where the temperature Tplug of the spark generation part 30a corresponds to a second temperature higher than the first temperature (refer to "Tplug2" in the block B1 of FIG. 9) (refer to the values Llmt1 and Llmt2 in the block B1 and the steps 935 and 955 of FIG. 9).

Further, the control part is configured to change the lower limit Llolmt depending on the fuel pressure Pfc in consideration of the fact that the adhering amount of the fuel is the first amount under a state where the fuel pressure Pfc at the timing of carrying out the preceding injection InjC corresponds to a first pressure and the adhering amount of the fuel is the second amount under a state where the fuel pressure Pfc at the timing of carrying out the preceding injection InjC corresponds to a second fuel pressure lower than the first pressure (refer to the block B2 and the steps 940 and 955 of FIG. 9).

Furthermore, the control part is configured to change the lower limit Llolmt depending on the fuel injection amount Qc of the preceding injection InjC in consideration of the fact that the adhering amount of the fuel is the first amount under a state where the fuel injection amount Qc of the preceding injection InjC corresponds to a first injection amount and the adhering amount of the fuel is the second amount under a state where the fuel injection amount Qc of the preceding injection InjC corresponds to a second injection amount smaller than the first injection amount (refer to the block B3 and the steps 945 and 955 of FIG. 9).

Further, the control part is configured to:
acquires the first parameter (the insulation breakdown voltage Vk) expressing the degree of the smolder of the spark generation part 30a; and
change the lower limit Llolmt such that the lower limit Llolmt increases as the degree of the smolder expressed by the acquired first parameter increases (refer to the block B4 and the steps 950 and 955 of FIG. 9).

Therefore, according to the first device, when the fuel is likely to adheres to the spark generation part 30a or when the degree of the smolder of the spark plug 30 is large, the excessive increasing of the degree of the spread of the fuel spray is prevented and thus, the excessive increasing of the amount of the fuel adhering to the spark generation part 30a is prevented. As a result, the fast increasing of the degree of the smolder of the spark plug 30 can be prevented.

It should be noted that the first device may not correct the lower limit base value Llmtst acquired at the step 935 of FIG. 9. That is, the lower limit base value Llmtst itself may be used as a conclusive lower limit value Llolmt.

Further, the first device may acquire a conclusive lower limit Llolmt by correcting the lower limit base value Llmtst acquired at the step 935 by using one or more of the correction values such as the fuel pressure correction value ΔLpfc, the preceding injection amount correction value ΔLQc and the plug smolder degree correction value ΔLvk.

Furthermore, the first device may acquire the lower limit Llolmt directly from the fuel pressure Pfc such that the lower limit Llolmt increases as the fuel pressure Pfc increases. Similarly, the first device may acquire the lower limit Llolmt directly from the preceding injection amount Qc such that the lower limit Llolmt increases as the preceding injection amount Qc increases. Further, the first device may acquire the lower limit Llolmt directly from the first parameter such that the lower limit Llolmt increases as the degree of the smolder of the spark plug 30 expressed by the first parameter (the insulation breakdown voltage Vk) increases.

<First Modification of First Device>

The CPU may be configured to use the cooling water temperature THW as the temperature Tplug of the spark generation part 30a at the step 935 of FIG. 9. In this case, the lower limit base value Llmtst of the maximum value Lc of the needle lift amount in the preceding injection InjC is determined such that the lower limit base value Llmtst increases (that is, the degree of the spread of the fuel spray decreases) as the cooling water temperature THW lowers.

Figure 10:
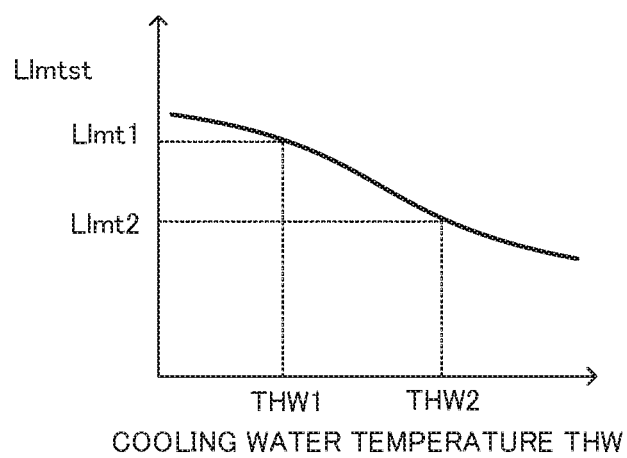
FIG. 10 is a lookup table referred by the CPU according to the first modification of the first device.

In particular, the CPU determines the lower limit base value Llmtst of the maximum value of the needle lift amount in the preceding injection InjC on the basis of the cooling water temperature THW. That is, the CPU determines the lower limit base value Llmtst by applying the cooling water temperature THW to a lookup table MapLlmtst(THW) shown in FIG. 10.

According to the table MapLlmtst (THW), the lower limit base value Llmtst is determined such as the lower limit base value Llmtst decreases as the cooling water temperature THW increases (that is, as the amount of the fuel adhering to the spark generation part 30a at the ignition timing SA decreases).

However, when the cooling water temperature THW is used in place of the temperature Tplug, the control of the maximum value Lc of the needle lift amount by using the lower limit Llolmt is desirably carried out at the start of the operation of the engine 10 and/or during the several ignitions are carried out after the start of the operation of the engine 10.

<Second Modification of First Device>

The CPU of the second modification of the first device employs the fuel pressure Pf acquired at a timing adjacent to the intake top dead center as the fuel pressure Pfc at the timing of carrying out the preceding injection InjC used at the step 940, etc. of FIG. 9 assuming that the fuel pressure Pf moderately changes such that there is almost no change of the fuel pressure Pf during one rotation of the engine 10.

Second Embodiment

The control device of the engine according to the second embodiment of the invention (hereinafter, this control device may be referred to as "the second device") is the same as the first device except that the second device changes the lower limit Llolmt in consideration of the influence of the flow of the fuel in the sac chamber Sk of the injector 20 generated by the pre-injection InjB on the preceding injection InjC. Hereinafter, the flow of the fuel remaining in the sac chamber Sk of the injector 20 at the start timing (the injection start timing SOIc) of the preceding injection InjC may be simply referred to as "the sac chamber fuel flow".

In particular, the flow of the fuel (the turbulence of the flow of the fuel) occurs in the sac chamber Sk of the injector 20 by the pre-injection InjB. If the preceding injection InjC is carried out under a state that the fuel flow remains in the sac chamber Sk, the spray of the injected fuel easily disperses (the degree of the spread of the fuel spray increases) and the penetration force weakens. Therefore, as the strength of the sac chamber fuel flow increases, the amount of the fuel (the fuel spray) reaching the spark generation part 30a increases and as a result, the amount of the fuel adhering to the spark generation part 30a increases.

The strength of the sac chamber fuel flow increases as the time period between the injection end timing EOIb of the pre-injection InjB and the injection start timing SOIc of the preceding injection InjC shortened. Hereinafter, the time period will be referred to as "the interval Tint with respect to the pre-injection InjB". Therefore, the degree of the spread of the spray of the fuel injected by the preceding injection InjC increases as the interval Tint with respect to the pre-injection InjB shortens.

Further, the strength of the sac chamber fuel flow increases as the fuel injection amount Qb of the pre-injection InjB increases. Therefore, the degree of the spread of the spray of the fuel injected by the preceding injection InjC increases as the fuel injection amount Qb increases.

Accordingly, the second device estimates the strength Sff of the sac chamber fuel flow on the basis of the fuel injection amount Qb of the pre-injection InjB and the interval Tint with respect to the pre-injection InjB and increases the lower limit Llolmt as the strength Sff of the sac chamber fuel flow increases. As a result, the second device substantially increases the lower limit Llolmt as the interval Tint with respect to the pre-injection 4B shortens and the second device substantially increases the lower limit Llolmt as the fuel injection amount Qb increases. Thereby, the ignition under a state where the amount of the fuel adhering to the spark generation part 30a is large, is prevented and thus, the fast increasing of the degree of the smolder of the spark plug 30 can be prevented.

<Actual Actuation of Second Device>

Figure 11:
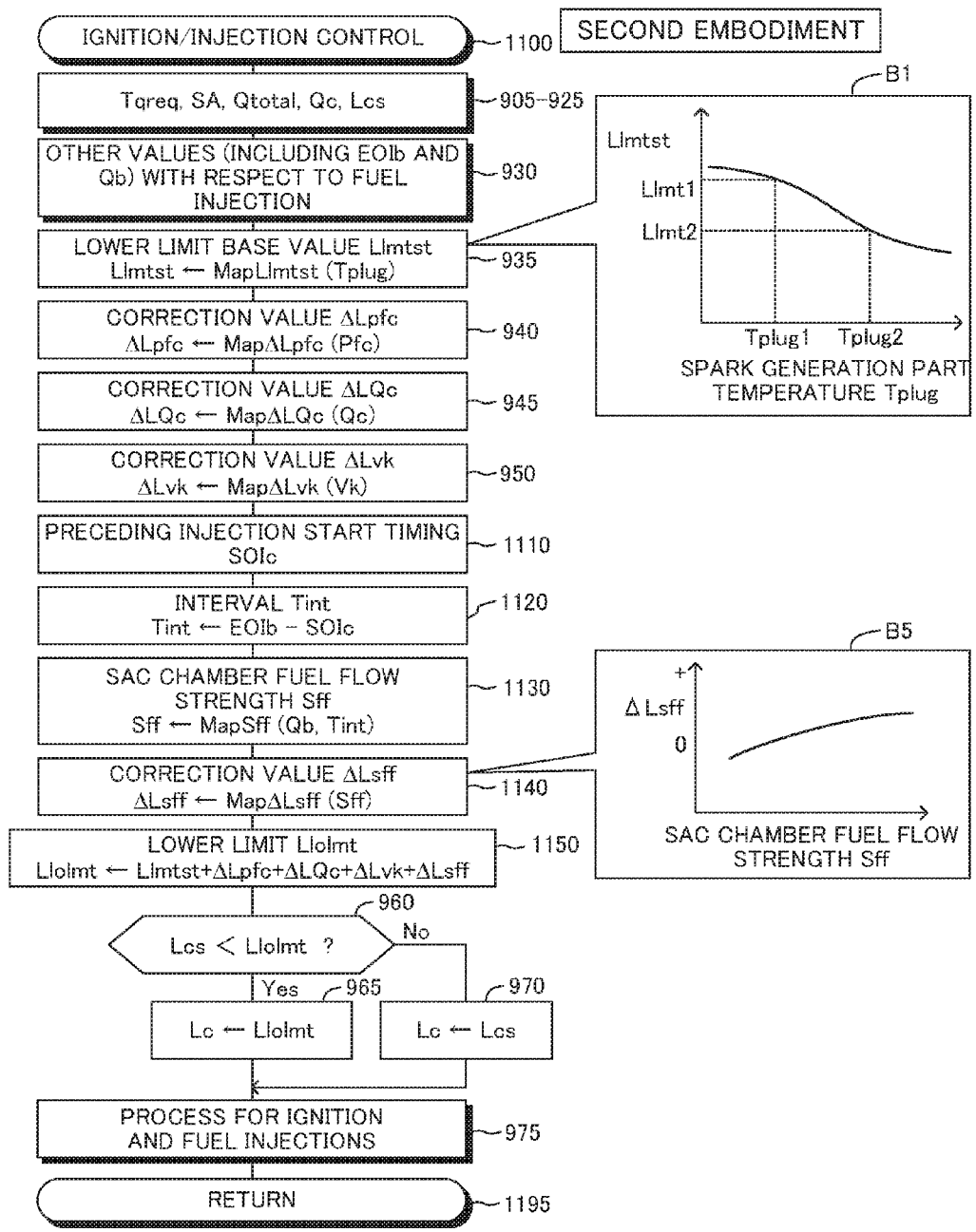
FIG. 11 is a flow chart showing a routine executed by the CPU of the control device (the second device) according to the second embodiment of the invention.

The CPU of the second device is configured to execute a process of the ignition/injection control routine shown in FIG. 11 by a flow chart for an optional cylinder every the crank angle of the optional cylinder corresponds to the intake top dead center of the optional cylinder.

Therefore, when the crank angle of a certain cylinder (a particular cylinder (#N)) corresponds to the top dead center of the particular cylinder, the CPU starts the process from the step 1100 and executes the processes of the steps 905 to 925 described above in sequence. Thereby, the required torque Tqreq, the ignition timing SA, the total injection amount Qtotal, the preceding injection amount Qc, the base value Lcs of the maximum value of the needle lift amount in the preceding injection InjC, etc. are determined.

Next, the CPU executes the process of the step 930 described above to determine the other values with respect to the fuel injections. The determined values include following values.

Injection start and end timings SOIb and EOIb of the pre-injection InjB.

Fuel injection amount Qb of the pre-injection InjB.

Injection start and end timings SOIa and EOIa of the intake stroke injection InjA.

Fuel injection amount Qa of the intake stroke injection InjA.

Further, the CPU executes the processes of the steps 935 to 950 described above in sequence. Thereby, the following values are acquired.

Lower limit base value (the base value of the lower limit) Llmtst of the maximum value of the needle lift amount in the preceding injection InjC.

Fuel pressure Pfc at the injection start timing SOIc of the preceding injection InjC.

Fuel pressure correction value ΔLpfc (Correction value ΔLpfc for correcting the lower limit base value Llmtst).

Preceding injection amount correction value ΔLQc (Correction value ΔLQc for correcting the lower limit base value Llmtst).

Plug smolder degree correction value ΔLvk (Correction value ΔLvk for correcting the lower limit base value Llmtst).

Next, the CPU executes the processes of the step 1110 to 1150 described below in sequence and then, proceeds to the step 960.

Step 1110: The CPU determines the injection start timing SOIc of the preceding injection InjC on the basis of the engine speed NE. That is, the CPU determines the injection start timing SOIc such that the injection start timing SOIc advances as the engine speed NE increases.

Step 1120: The CPU acquires a crank angle width CAint between the injection end timing EOIb of the pre-injection InjB and the injection start timing SOIc of the preceding injection InjC by subtracting the injection start timing SOIc of the preceding injection InjC from the injection end timing EOIb of the pre-injection InjB (CAint=InjC+InjB) and determines the interval Tint with respect to the pre-injection InjB on the basis of the acquired crank angle width CAint and the engine speed NE (refer to FIG. 8(B)).

Step 1130: The CPU estimates (acquires/determines) the strength Sff of the sac chamber fuel flow on the basis of the fuel injection amount Qb of the pre-injection InjB and the interval Tint with respect to the pre-injection InjB. In particular, the CPU acquires the strength Sff of the sac chamber fuel flow by applying the fuel injection amount Qb and the interval Tint to a lookup table MapSff(Qb, Tint). According to the table MapSff(Qb, Tint), the strength SIT of the sac chamber fuel flow increases as the fuel injection amount Qb increases and the strength Sff of the sac chamber fuel flow increases as the interval Tint shortens.

Step 1140: The CPU calculates the fuel flow correction value ΔLsff (the correction value ΔLsff for correcting the lower limit base value Llmtst) by applying the estimated (acquired) strength Sff of the sac chamber fuel flow to a lookup table MapΔLsff(Sff) shown in the block 95 of FIG. 10. According to the table MapΔLsff(Sff), the calculated correction value ΔLsff increases as the estimated (acquired) strength Sff of the sac chamber fuel flow increases (strengthens).

Step 1150: The CPU acquires the sum of the lower limit base value Llmtst, the fuel pressure correction value ΔLpfc, the preceding injection amount correction value ΔLQc, the plug smolder degree correction value ΔLvk and the fuel flow correction value ΔLsff as the lower limit Llolmt of the maximum value of the needle lift amount of the preceding injection InjC (Llolmt=Llmtst+ΔLpfc+ΔLQc+ΔLvk+ΔLsff). That is, the lower limit base value Llmtst is corrected by the correction values ΔLpfc, ΔLQc, ΔLOvk and ΔLsff. As a result, the lower limit Llolmt increases as the temperature Tplug of the spark generation part 30a lowers. The lower limit Llolmt increases as the fuel pressure Pfc at the timing of carrying out the preceding injection InjC increases. The lower limit Llolmt increases as the preceding injection amount Qc increases. The lower limit Llolmt increases as the insulation breakdown voltage Vk lowers (that is, as the degree of the smolder of the spark plug 30 increases). The lower limit Llolmt increases as the strength Sff of the sac chamber fuel flow increases.

Next, the CPU proceeds to the step 960 where the CPU judges if the base value Lcs of the needle lift amount in the preceding injection InjC acquired at the foregoing step 925 is smaller than the lower limit Llolmt of the maximum value of the needle lift amount acquired at the step 1150.

When the base value Lcs is smaller than the lower limit Llolmt, the CPU judges "Yes" at the step 960 and proceeds to the step 965 where the CPU sets the lower limit Llolmt as the maximum value Lc of the needle lift amount in the preceding injection InjC. That is, in this case, the maximum value Lc is the lower limit Llolmt.

On the other hand, when the base value Lcs is larger than or equal to the lower limit Llolmt, the CPU judges "No" at the step 960 and proceeds to the step 970 where the CPU sets the base value Lcs as the maximum value Lc of the needle lift amount in the preceding injection InjC. That is, in this case, the maximum value Lc is the base value Lcs.

Then, the CPU proceeds to the step 975 described above where the CPU executes the processes for carrying out the ignition and each of the fuel injections, respectively. It should be noted that the CPU calculates a time period Tc (that is, the preceding injection time period Tc) necessary to inject the preceding injection amount Qc of the fuel under a state where the value Lc is set as the maximum value of the needle lift amount on the basis of the maximum value Lc, the preceding injection amount Qc and the fuel pressure Pfc at the step 975. Then, the CPU converts the preceding injection time period Tc to a corresponding crank angle width CAc on the basis of the engine speed NE and acquires the injection end timing EOIc of the preceding injection InjC by subtracting the crank angle width CAc from the injection start timing SOIa of the intake stroke injection InjA (EOIc=SOIa−CAc). Then, the CPU proceeds to the step 995 where the CPU terminates the routine.

As described above, the control part (the ECU 40) of the second device is configured to use the maximum value Lc of the needle lift amount in the preceding injection InjC as the disperse parameter similar to the first device (refer to FIG. 11).

Further, the control part is configured to control the disperse parameter (that is, the lower limit Llolmt of the maximum value Lc of the needle lift amount) for changing the degree of the spread of the fuel spray formed by the preceding injection InjC such that the maximum degree of the spread of the fuel spray formed by the preceding injection InjC under a state where the amount of the fuel adhering to the spark generation part 30a at the ignition timing SA corresponds to a first amount, is smaller than the maximum degree of the spread of the fuel spray formed by the preceding injection InjC that under a state where the amount of the fuel adhering to the spark generation part 30a at the ignition timing SA corresponds to a second amount smaller than the first amount (refer to the steps 925, 935 to 950, 1110 to 1150 and 960 to 970 of FIG. 11).

In addition, the control part is configured to:

acquire a second parameter (Sff) having a correlation with the strength of the sac chamber fuel flow; and change the lower limit Llolmt such that the lower limit Llolmt increases as the strength of the sac, chamber fuel flow expressed by the acquired second parameter increases (refer to the block B5 and the step 1130, 1140 and 1150 of FIG. 11).

Further, the control part is configured to acquire the second parameter (Sff) on the basis of the interval Tint with respect to the pre-injection InjB (the time period between the injection end timing EOIb of the pre-injection InjB and the injection stall timing SOIc of the preceding injection InjC) (refer to the step 1130 of FIG. 11). Furthermore, the control part is configured to acquire the second parameter (Sff) on the basis of the fuel injection amount Qb of the pre-injection InjB (refer to the step 1130 of FIG. 11).

Therefore, even when the strength of the sac chamber fuel flow is large, the excessive increasing of the degree of the spread of the fuel spray formed by the preceding injection InjC is prevented and thus, the excessive increasing of the amount of the fuel adhering to the spark generation part 30a is prevented. As a result, the fast increasing of the degree of the smolder of the ignition plug 30 can be prevented.

<First Modification of Second Device>

Figure 12:
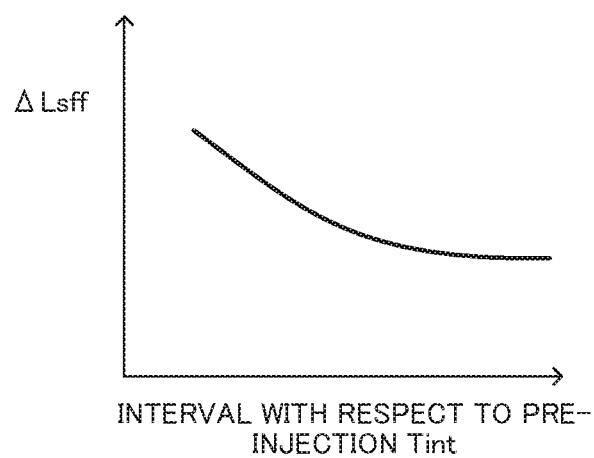
FIG. 12 is a lookup table referred by the CPU according to the first modification of the second device.

The CPU of the first modification of the second device calculates the fuel flow correction value ΔLsff (a correction value ΔLsff for correcting the lower limit base value Llmtst) by applying the interval Tint with respect to the pre-injection InjB to a lookup table MapΔLsff(Tint) shown in FIG. 12. According to the table MapΔLsff(Tint), the calculated correction value ΔLsff increases as the interval Tint with respect to the pre-injection InjB shortens.

<Second Modification of Second Device>

The CPU of the second modification of the second device calculates the fuel flow correction value ΔLsff (a correction value ΔLsff for correcting the lower limit base value Llmtst) by applying the fuel injection amount Qb of the pre-injection InjB to a lookup table MapΔLsff(Qb) not shown. According to the table MapΔLsff(Qb), the calculated correction value ΔLsff increases as the fuel injection amount Qb increases.

Third Embodiment

The control device of the engine according to the third embodiment of the invention (hereinafter, this control device may be referred to as "the third device") changes the minimum value Tmin of the interval Tint with respect to the pre-injection InjB in consideration of the influence of the sac chamber fuel flow on the preceding injection InjC. That is, the third device employs the interval Tint with respect to the pre-injection InjB as the disperse parameter for changing the degree of the spread of the fuel spray formed by the preceding injection InjC.

When the interval Tint with respect to the pre-injection InjB is limited to the minimum value Tmin, the strength of the sac chamber fuel flow weakens and the minimum value Tmin increases. Therefore, in this case, the degree of the spread of the spray of the fuel injected by the preceding injection InjC decreases and the amount of the fuel adhering to the spark generation part 30a decreases. As a result, the fast increasing of the degree of the smolder of the spark plug 30 can be prevented.

<Actual Activation of Third Device>

The CPU of the third device is configured to execute a process of the ignition/injection control routine shown in FIG. 13 by a flow chart for an optional cylinder every the crank angle of the optional cylinder corresponds to the intake top dead center of the optional cylinder.

Therefore, when the crank angle of a certain cylinder (a particular cylinder (#N)) corresponds to the intake top dead center of the particular cylinder, the CPU starts the process from the step 1300 and executes the processes of the steps 905 to 920 as described above in sequence. Thereby, the required torque Tqreq, the ignition timing SA, the total injection amount Qtotal and the preceding injection amount Qc are determined.

Next, the CPU proceeds to the step 1310 where the CPU determines the maximum value Lc of the needle lift amount in the preceding injection InjC. In particular, the CPU determines the maximum value Lc of the needle lift amount by applying the engine speed NE and the cooling water temperature THW to a lookup table MapLc(NE, THW). According to the table MapLc(NE, THW), the determined maximum value Lc decreases as the engine speed NE decreases. The determined maximum value Lc decreases as the cooling water temperature THW decreases.

Next, the CPU executes the process of the step 930 described above where the CPU determines the other values with respect to the fuel injections. The determined other values include the injection start timing SOIb, the injection end timing EOIb and the fuel injection amount Qb of the pre-injection InjB. Next, the CPU executes the process of the step 1110 described above where the CPU determines the injection start timing SOIc of the preceding injection InjC. Then, the CPU executes the processes of the steps 1320 to 1350 described below in sequence and then, proceeds to the step 1360.

Step 1320: The CPU acquires a crank angle width CAint between the injection end timing EOIb of the pre-injection InjB and the injection start timing SOIc of the preceding injection InjC by subtracting the injection start timing SOIc of the preceding injection InjC from the injection end timing EOIb of the pre-injection InjB (CAint=EOIb−SOIc) and then, determines the interval base value Tintst (the base value Tintst of the interval Tint with respect to the pre-injection InjB) on the basis of the acquired crank angle width CAint and the engine speed NE.

Step 1330: The CPU determines a interval minimum base value Tminst (a base value Tminst of the minimum value of the interval Tint with respect to the pre-injection InjB) on the basis of the spark generation part temperature Tplug acquired separately as described above. In particular, the CPU determines the interval minimum base value Tminst by applying the spark generation part temperature Tplug to a lookup table MapTminst(Tplug) shown in the block B6 of FIG. 13.

According to the table MapTminst(Tplug), the determined interval minimum base value Tminst decreases (shortens) as the spark generation part temperature Tplug increases (that is, as the amount of the fuel adhering to the spark generation part 30a at the ignition timing SA decreases). The interval minimum base value Tminst is a base value of the minimum value Tmin of the interval Tint with respect to the pre-injection InjB (the time period Tint between the injection end timing EOIb of the pre-injection InjB and the injection start timing SOIc of the preceding injection InjC) calculated at the step 1350 described below. Therefore, such an acquisition of the interval minimum base value Tminst means that the permissible interval Tint with respect to the pre-injection InjB decreases (shortens) as the spark generation part temperature Tplug increases and thus, the permissible degree of the spread of the fuel spray increases.

Step 1340: The CPU reads out the insulation breakdown voltage Vk of the spark plug 30(#N) of the particular cylinder (#N) acquired separately by a routine not shown similar to the step 950 described above. Further, the CPU calculates the correction value ΔTvk (the plug smolder degree correction value ΔTvk) for correcting the interval minimum base value Tminst by applying the read out insulation breakdown voltage Vk to a lookup table MapΔTvk(Vk) shown in the block B7 of FIG. 13. According to the table MapΔTvk(Vk), the calculated correction value ΔTvk increases as the insulation breakdown voltage Vk lowers. It should be noted that the correction value ΔTvk is zero when the insulation breakdown voltage Vk is larger than or equal to the base insulation breakdown voltage Vkth.

Step 1350: The CPU acquires a value obtained by adding the plug smolder degree correction value ΔTvk to the interval minimum base value Tminst as the minimum value Tmin of the interval Tint with respect to the pre-injection InjB (Tmin=Tminst+ΔTvk). That is, the interval minimum base value Tminst is corrected by the plug smolder degree correction value ΔTvk. As a result, the minimum value Tmin increases as the spark generation part temperature Tplug lowers. Further, the minimum value Tmin increases as the insulation breakdown voltage Vk lowers (that is, as the degree of the smolder of the spark plug 30 increases).

Next, the CPU proceeds to the step 1360 where the CPU judges if the interval base value Tintst acquired at the foregoing step 1320 is smaller than the minimum value Tmin acquired at the foregoing step 1350.

When the base value Tintst is smaller than the minimum value Tmin, the CPU judges "Yes" at the step 1360 and then, proceeds to the step 1370 where the CPU set the minimum value Tmin as the interval Tint with respect to the pre-injection InjB. That is, in this case, the interval Tint with respect to the pre-injection InjB is the minimum value Tmin.

Next, the CPU proceeds to the step 1380 where the CPU corrects the injection end and start timings EOIb and SOIb of the pre-injection InjB on the basis of the interval Tint determined at the step 1370. That is, the CPU converts the interval Tint with respect to the pre-injection InjB determined at the step 1370 to a corresponding crank angle width CAint on the basis of the engine speed NE and then, the CPU acquires a value by adding the crank angle width CAint to the injection start timing SOIc acquired at the step 1110 as a new (conclusive) injection end timing EOIb of the pre-injection InjB (EOIb=SOIc+CAint). Further, the CPU converts the fuel injection time period Tb to a corresponding crank angle width CAb on the basis of the engine speed NE and then, determines a crank angle obtained by adding the crank angle width CAb to the injection end timing EOIb as the injection start timing SOIb of the pre-injection InjB (SOIs=EOIb+CAb). Then, the CPU proceeds to the step 975.

On the other hand, when the base value Tintst is larger than or equal to the minimum value Tmin, the CPU judges "No" at the step 1360 and then, proceeds to the step 1390 where the CPU sets the base value Tintst as the interval Tint with respect to the pre-injection InjB. That is, in this case, the interval Tint with respect to the pre-injection InjB is the base value Tintst. Then, the CPU proceeds to the step 975.

At the step 975, the CPU executes the processes for carrying out the ignition at the ignition timing SA the intake stroke injection InjA, the pre-injection InjB and the preceding injection InjC, respectively.

As described above, the control part (the ECU 40) of the third device is configured to use the interval Tint with respect to the pre-injection InjB (the time period Tint between the injection end timing EOIb of the pre-injection InjB and the injection start timing SOIc of the preceding injection InjC) as the disperse parameter (refer to FIG. 13).

Further the control part is configured to change the minimum value Tmin of the interval Tint on the basis of the temperature Tplug of the spark generation part 30*a* in consideration of the fact that the adhering amount of the fuel is the first amount under a state where the temperature Tplug of the spark generation part 30*a* corresponds to a first temperature (refer to "Tplug1" in the block B6 of FIG. 13) and the adhering amount of the fuel is the second amount under a state where the temperature Tplug of the spark generation part 30*a* corresponds to a second temperature higher than the first temperature (refer to "Tplug2" in the block B6) (refer to the values Tmin1 and Tmin2 in the block B6 and the steps 1330 and 1350 of FIG. 13).

Further, the control part is configured to:
acquire a first parameter (the insulation breakdown voltage Vk) expressing the degree of the smolder of the spark generation part 30*a*; and
change the minimum value Tmin such that the minimum value Tmin increases as the degree of the smolder of the spark plug expressed by the acquired first parameter increases (refer to the bloke B7 and the steps 1340 and 1350 of FIG. 13).

Therefore, the sac chamber fuel flow is weakened when the strength of the sac chamber fuel flow is excessively large compared with the easiness of the adhering of the fuel to the spark generation part 30*a* and/or the degree of the smolder of the spark generation part 30*a*. Thereby, the excessive increasing of the degree of the spread of the fuel spray formed by the preceding injection InjC is prevented and thus, the excessive increasing of the amount of the fuel adhering to the spark generation part 30*a* is prevented. As a result, the fast increasing of the degree of the smolder of the ignition plug 30 can be prevented.

It should be noted that the third device may use the minimum value Tmin without correcting the interval minimum base value Tminst acquired at the step 1330.

As described above, according to the devices of the embodiments and modifications of the invention, the preceding injection InjC can be carried out while the excessive increasing of the amount of the fuel adhering to the spark generation part 30*a* is prevented. As a result, the fast increasing of the degree of the smolder of the ignition plug 30 can be prevented.

The invention is not limited to the embodiments described above and the various modifications can be employed within the scope of the invention. For example, the present control device may acquire the temperature Tplug of the spark generation part 30*a* as described below The present control device acquires the cooling water temperature THW at the engine operation start as the engine operation start cooling water temperature THWs.

The present control device estimates an amount of the heat generated by the engine 10 per one cycle on the basis of the required torque Tqreq and estimates the increase value of the temperature of the spark generation part 30*a* (or the temperature in the combustion chamber CC) per one cycle on the basis of the estimated amount of the heat.

The present control device acquires a value by adding the integration value of the estimated increase values of the temperature to the engine operation start cooling water temperature THWs as the temperature Tplug of the spark generation part 30*a*.

The present control device may acquire the strength Sff of the sac chamber fuel flow as described below The present control device acquires the fuel pressure in the sac chamber Sk during the time period (the interval time period) between the injection end timing EOIb of the pre-injection InjB and the injection start timing SOIc of the preceding injection InjC on the basis of the output value of a pressure sensor including a piezo element provided in the sac chamber Sk every a pre-determined time period elapses.

The present control device acquires a value expressing the change of the fuel pressure in the sac chamber Sk during the interval time period (for example, an average of the amplitude of the change of the fuel pressure during the interval time period) on the basis of the acquired data and then, acquires the strength Sff of the sac chamber fuel flow on the basis of the acquired value expressing the change of the fuel pressure in the sac chamber Sk. In this case, as the change (the amplitude of the change) increases, the acquired strength SIT of the sac chamber fuel flow increases.

It should be noted that the present control device may detect the pressure of the fuel upstream of the abutting part (that is, the valve seating part) between the valve body (the needle valve 22) and the edge part of each of the injection holes 21*a* in the fuel injector 20 during the interval dine period and acquire the strength Sff of the sac chamber fuel flow on the basis of the value expressing the change of the detected fuel pressure during the interval time period.

The present control device may have a measurement device for measuring the insulation resistance of the spark generation part 30*a* and use the insulation resistance measured by the measurement device as the first parameter expressing the degree of the smolder of the spark generation part 30a. In this case, the determined first parameter indicates that the degree of the smolder of the spark generation part 30a increases as the insulation resistance decreases.

As described above, the first and second devices acquire the lower limit Llolmt by adding the sum of the correction values ΔLpfc, ΔLQc, ΔLvk, etc, to the lower limit base value Llmtst. On the other hand, the present control device may acquire correction coefficients kLpk, kLQc, kLvk and kLsff in place of the correction values ΔLpfc, ΔLQc, ΔLvk and ΔLsff and then, acquire the lower limit Llolmt by multiplying the lower limit base value Llmtst by the correction coefficients kLpfc, kLQc, kLvk and kLsff.

Further, the injector 20 is a type of an injector in which its injection holes 21a are closed directly by the tip end part of the needle valve 22. However, the injector 20 may be a type of an injector in which the injection holes 21a are formed to always communicate with the relatively large sac chamber and the needle valve 22 moves to open and close the connection part between the sac chamber and the fuel flow passage FP (the internal valve type of the injector).

Further, the present control device may change the degree of the spread of the fuel spray formed by the preceding injection InjC by using the both of the maximum value Lc of the needle lift amount in the preceding injection InjC and the interval Tint with respect to the pre-injection InjB as the disperse parameters, respectively while limiting the maximum value Lc of the needle lift amount in the preceding injection InjC and the interval Tint with respect to the pre-injection InjB to the lower limit Llolmt and the minimum value Tmin, respectively.

Further, the engine 10 which the present control device is applied to, may be a spray-guided type of an internal combustion engine in which the injection holes are provided at the border between the cylinder bore and the cylinder head and the fuel is injected toward the central part of the combustion chamber CC (that is, the spark generation part 30a).

Further, in the present control device, the maximum value Lc and the lower limit Llolmt of the needle lift amount in the preceding injection InjC corresponds to each other at all times. That is, for example, the present control device may acquire the maximum value Lc which increases as the spark generation part temperature Tplug lowers and carry out the preceding injection InjC by using the acquired maximum value Lc.

The invention claimed is:

1. A control device applied to a cylinder injection type of an internal combustion engine, comprising:
at least one cylinder;
an ignition plug having a spark generation part; and
an injector having a movable valve and at least one injection hole, said injector injecting a fuel into said cylinder via said injection hole by a movement of said movable valve body such that the fuel spray including at least part of the fuel injected by said injector reaching directly said spark generation part,
the control device comprising a control part configured to make said injector inject the fuel and make said spark generation part generate a spark for an ignition of the fuel at a predetermined ignition timing,
wherein said control part is configured to control a disperse parameter for changing a degree of a spread of the fuel spray such that the maximum degree of the spread of the fuel spray under a state where an amount of the fuel adhering to said spark generation part at the ignition timing corresponds to a first amount, is smaller than the maximum degree of the spread of the fuel spray under a state where the amount of the fuel adhering to said spark generation part at the ignition timing corresponds to a second amount smaller than said first amount.

2. The control device for the engine of claim 1, wherein said control part is configured to:
use a maximum value of a lift amount of said valve body in the fuel injection as said disperse parameter; and
decrease the maximum degree of the spread of the fuel spray by changing a lower limit of the maximum value of the lift amount in a preceding injection carried out immediately before the ignition timing such that said lower limit under a state where the adhering amount of the fuel corresponds to said first amount, is larger than said lower limit under a state where the adhering amount of the fuel corresponds to said second amount.

3. The control device for the engine of claim 2, wherein said control part is configured to change said lower limit on the basis of the temperature of said spark generation part in consideration of the fact that the adhering amount of the fuel corresponds to said first amount under a state where the temperature of said spark generation part corresponds to a first temperature and the adhering amount of the fuel corresponds to said second amount under a state where the temperature of said spark generation part corresponds to a second temperature higher than said first temperature.

4. The control device for the engine of claim 3, wherein said control part is configured to acquire the temperature of said spark generation part on the basis of a temperature of a cooling water of said engine.

5. The control device for the engine of claim 2, wherein said control part is configured to change said lower limit on the basis of a fuel pressure at the timing of carrying out said preceding injection in consideration of the fact that the adhering amount of the fuel corresponds to said first amount under a state where the fuel pressure at the timing of carrying out said preceding injection corresponds to a first pressure and the adhering amount of the fuel corresponds to said second amount under a state where the fuel pressure at the timing of carrying out said preceding injection corresponds to a second pressure lower than said first pressure.

6. The control device for the engine of the claim 2, wherein said control part is configured to change said lower limit on the basis of a fuel injection amount of said preceding injection in consideration of the fact that the adhering amount of the fuel corresponds to said first amount under a state where the fuel injection amount of said preceding injection corresponds to a first injection amount and the adhering amount of the fuel corresponds to said second amount under a state where the fuel injection amount of said preceding injection corresponds to a second injection amount smaller than said first injection amount.

7. The control device for the engine of claim 2, wherein said control part is configured to:
acquire a first parameter expressing the degree of the smolder of said spark generation part; and
change said lower limit such that said lower limit increases as the strength of the degree of the smolder expressed by said acquired first parameter increases.

8. The control device for the engine of claim 2, wherein said injector has a sac chamber at a tip end part of said injector, said sac chamber communicating with said injection hole under a state where at least said valve body is moved, said control device is configured to:
execute the fuel injection in addition to said preceding injection by said injector as a pre-injection before said preceding injection;
acquire a second parameter having a correlation with the strength of a sac chamber fuel flow generated by said pre-injection and remaining in said sac chamber at an injection start timing of said preceding injection; and
change said lower limit such that said lower limit increases as the strength of the sac chamber fuel flow expressed by said acquired second parameter increases.

9. The control device for the engine of claim 8, wherein said control part is configured to acquire said second parameter on the basis of a time period between the injection end timing of said pre-injection and the injection start timing of said preceding injection.

10. The control device for the engine of claim 8, wherein said control part is configured to acquire said second parameter on the basis of the fuel injection amount of said pre-injection.

11. The control device for the engine of claim 8, wherein said control part is configured to:
acquire at least one of a pressure of the fuel in said sac chamber during a time period between the injection end timing of said pre-injection and the injection start timing of said preceding injection and a pressure of the fuel in the injector upstream of a valve seating part during a time period between the injection end timing of said pre-injection and the injection start timing of said preceding injection, said valve seating part corresponding to a part where said valve body abuts an edge portion of said injection hole; and
to acquire said second parameter on the basis of a change of said acquired pressure of the fuel.

12. The control device for the engine of claim 1, wherein said injector has a sac chamber at a tip end part of said injector, said sac chamber communicating with said injection hole under a state where at least said valve body is moved,
said control part is configured to:
execute a fuel injection in addition to said preceding injection by said injector as a pre-injection before said preceding injection;
use a time period between the injection end timing of said pre-injection and the injection start timing of said preceding injection as said disperse parameter; and
decrease the maximum degree of the spread of the fuel spray by changing a minimum value of said time period such that said minimum value of said time period under a state where the adhering amount of the fuel corresponds to said first amount, is larger than said minimum value of said time period under a state where the adhering amount of the fuel corresponds to said second amount.

13. The control device for the engine of claim 12, wherein said control part is configured to change said minimum value of said time period on the basis of the temperature of said spark generation part in consideration of the fact that the adhering amount of the fuel corresponds to said first amount under a state where the temperature of said spark generation part corresponds to a first temperature and the adhering amount of the fuel corresponds to said second amount under a state where the temperature of said spark generation part corresponds to a second temperature higher than said first temperature.

14. The control device for the engine of claim 13, wherein said control part is configured to acquire the temperature of said spark generation part on the basis of a temperature of a cooling water of said engine.

15. The control device for the engine of claim 13, wherein said control part is configured to:
acquire a first parameter expressing the degree of the smolder of said spark generation part; and
change said minimum value of said time period such that said minimum value of said time period increases as the degree of the smolder expressed by said acquired first parameter increases.

* * * * *